(12) United States Patent
Yao

(10) Patent No.: US 12,372,628 B2
(45) Date of Patent: Jul. 29, 2025

(54) SINE-COSINE OPTICAL FREQUENCY DETECTION DEVICES FOR PHOTONICS INTEGRATED CIRCUITS AND APPLICATIONS IN LIDAR AND OTHER DISTRIBUTED OPTICAL SENSING

(71) Applicant: Xiaotian Steve Yao, Las Vegas, NV (US)

(72) Inventor: Xiaotian Steve Yao, Las Vegas, NV (US)

(*) Notice: Subject to any disclaimer, the term of this patent is extended or adjusted under 35 U.S.C. 154(b) by 303 days.

(21) Appl. No.: 18/130,372

(22) Filed: Apr. 3, 2023

(65) Prior Publication Data

US 2023/0236295 A1 Jul. 27, 2023

Related U.S. Application Data

(63) Continuation-in-part of application No. 17/515,050, filed on Oct. 29, 2021, now Pat. No. 11,619,783.

(60) Provisional application No. 63/163,500, filed on Mar. 19, 2021, provisional application No. 63/108,175, filed on Oct. 30, 2020.

(51) Int. Cl.
*G01S 7/4861* (2020.01)
*G01B 9/02015* (2022.01)
*G01S 7/484* (2006.01)
*G01S 17/32* (2020.01)
*G01S 7/481* (2006.01)

(52) U.S. Cl.
CPC ........ *G01S 7/4861* (2013.01); *G01B 9/02015* (2013.01); *G01S 7/484* (2013.01); *G01S 17/32* (2013.01); *G01S 7/4811* (2013.01)

(58) Field of Classification Search
CPC .............................. G01S 7/4861; G01S 17/32
See application file for complete search history.

(56) References Cited

U.S. PATENT DOCUMENTS

| | | | |
|---|---|---|---|
| 8,345,238 B2 | 1/2013 | Yao | |
| 10,742,324 B1 | 8/2020 | Padmaraju et al. | |
| 10,895,477 B2 | 1/2021 | Yao et al. | |
| 2009/0103100 A1* | 4/2009 | Froggatt | G01M 11/083 356/477 |
| 2017/0294967 A1 | 10/2017 | Schmogrow et al. | |
| 2018/0372517 A1 | 12/2018 | Yao et al. | |

(Continued)

*Primary Examiner* — Rhonda S Peace
(74) *Attorney, Agent, or Firm* — Perkins Coie LLP

(57) ABSTRACT

The disclosed technology can be implemented in photonics integrated circuit (PIC) to provide an optical frequency detection device for measuring an optical frequency of light using two Mach-Zehnder interferometer where the delay imbalance in the first interferometer is configured to be one quarter wavelength longer than that of the second interferometer to produce an additional phase difference between the two arms. The two outputs of each interferometer are then detected by two photodetectors to produce two complementary interference signals. The difference between the two complementary interference signals of the first interferometer is a sine function of the optical frequency while the difference between the two complementary interference signals of the second interferometer is proportional to a cosine function of the optical frequency. Using the sine/cosine interpretation algorithm commonly used for the rotation encoders/decoders, any increments in optical frequency can be readily obtained.

24 Claims, 24 Drawing Sheets shows an example of a sine/cosine optical frequency detector (OFD).

(56) References Cited

U.S. PATENT DOCUMENTS

| | | |
|---|---|---|
| 2019/0064358 A1 | 2/2019 | Desai et al. |
| 2022/0137298 A1 | 5/2022 | Yao |
| 2023/0236295 A1* | 7/2023 | Yao .................. G01S 7/4861 356/4.01 |

* cited by examiner

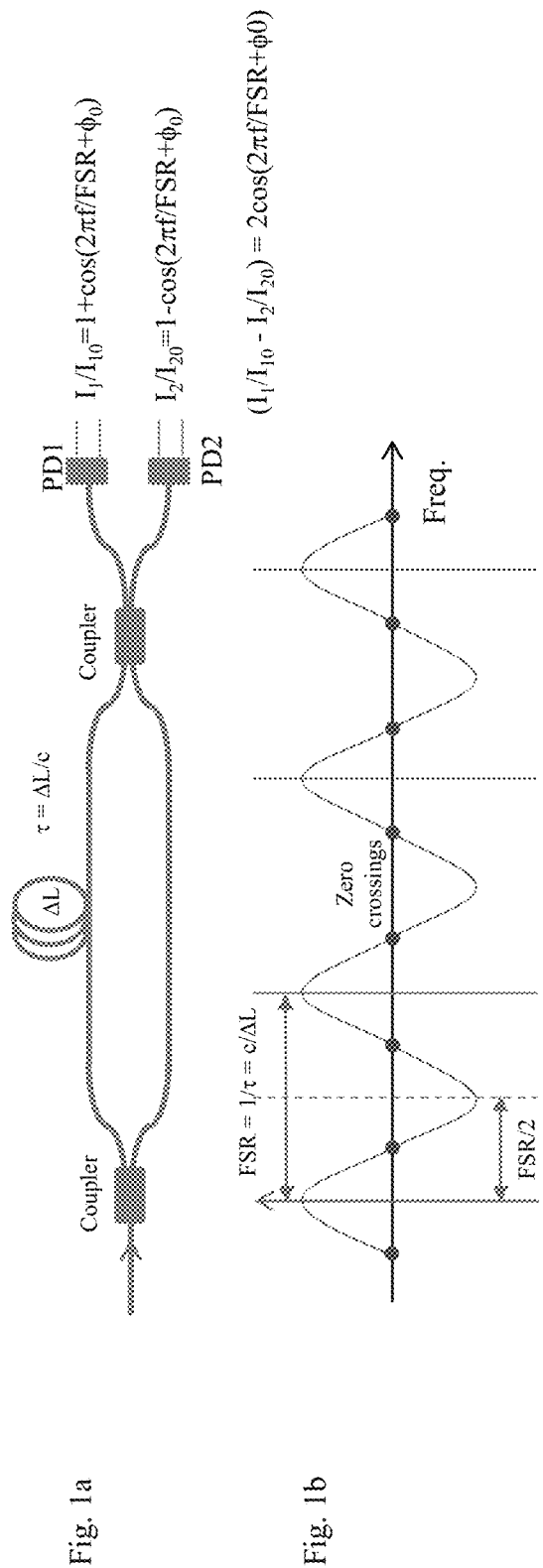
Fig. 1 includes Figs. 1a and 1b and shows an example of a Mach-Zehnder interferometer for incremental optical frequency detection (Prior art)

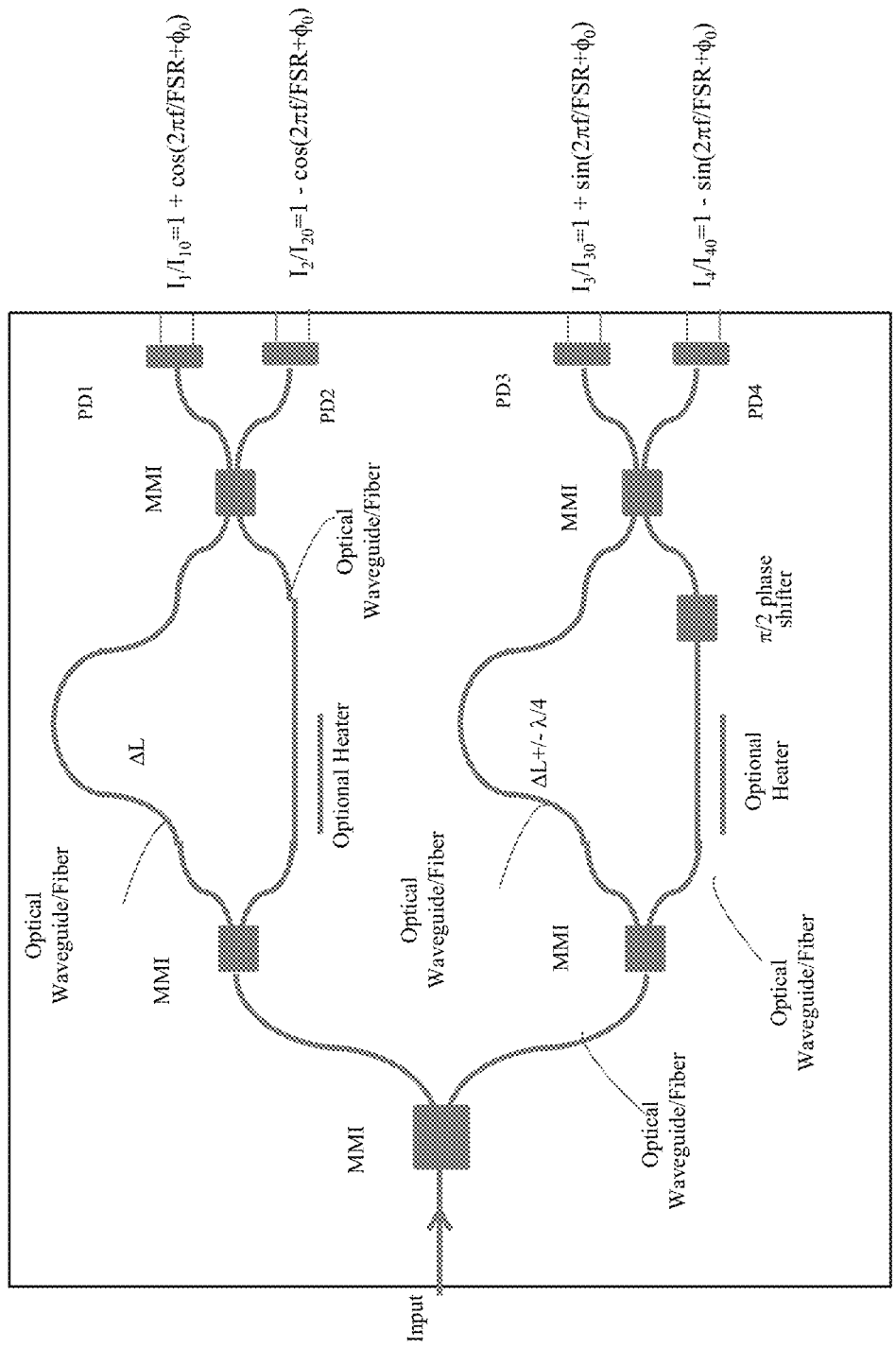
Fig. 2 shows an example of a sine/cosine optical frequency detector (OFD).

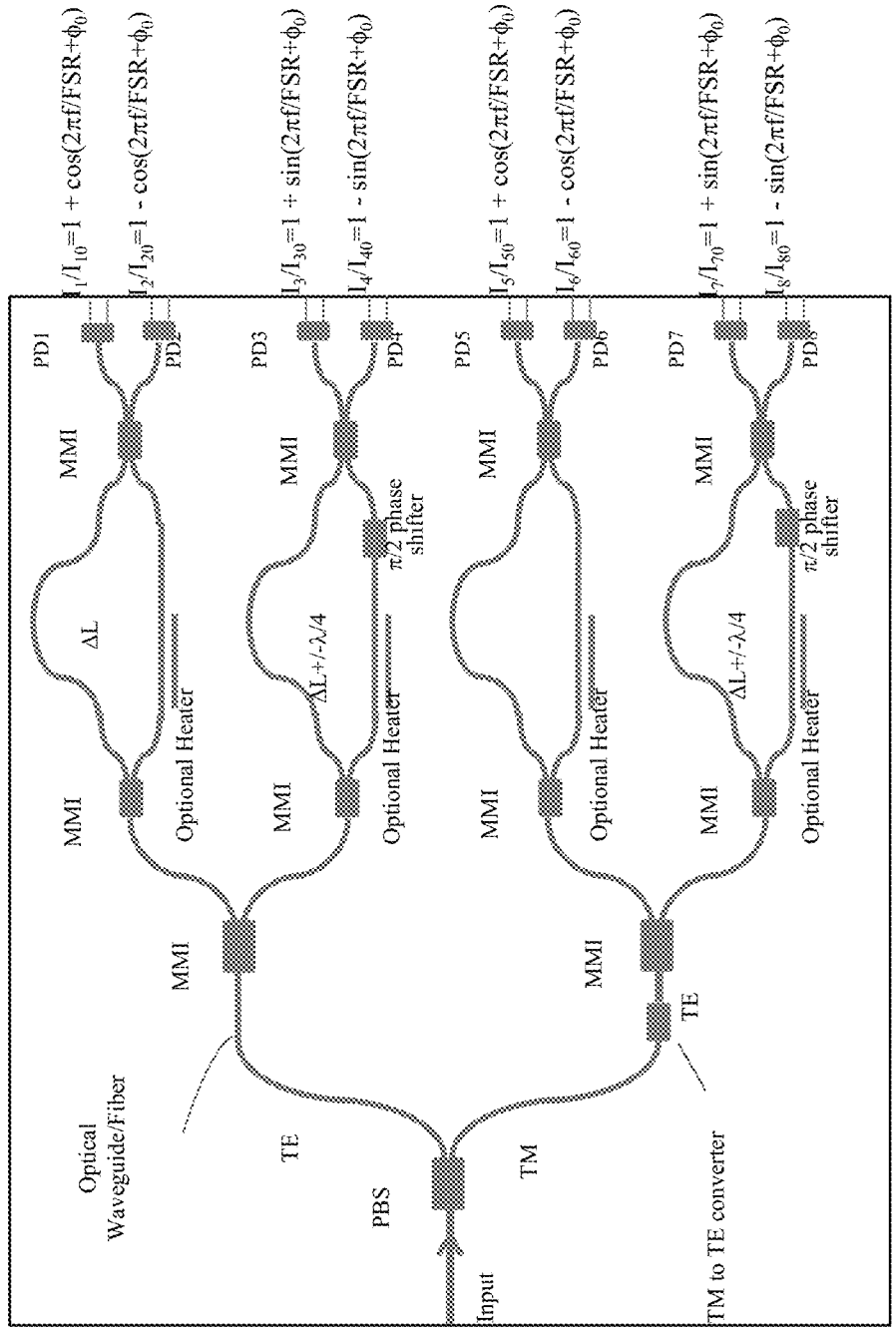
Fig. 3 shows an example of a polarization insensitive sine/cosine optical frequency detector.

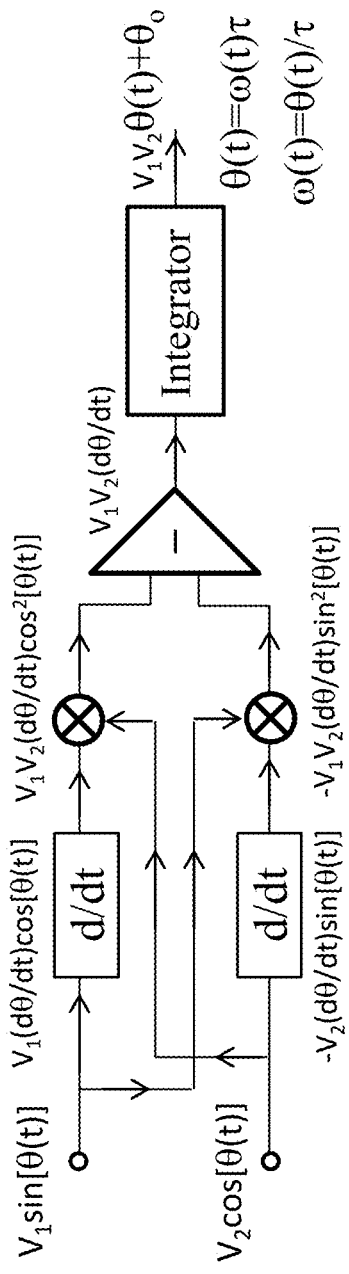
Fig. 4 shows an example of an analog circuit for obtaining the instant phase or frequency of the light signal.

Fig. 5 includes Figs. 5a and 5b and shows an example of a digital circuit for obtaining the instant phase or frequency of the light signal Fig. 5 includes Figs. 5a and 5b and shows an example of a digital circuit for obtaining the instant phase or frequency of the light signal

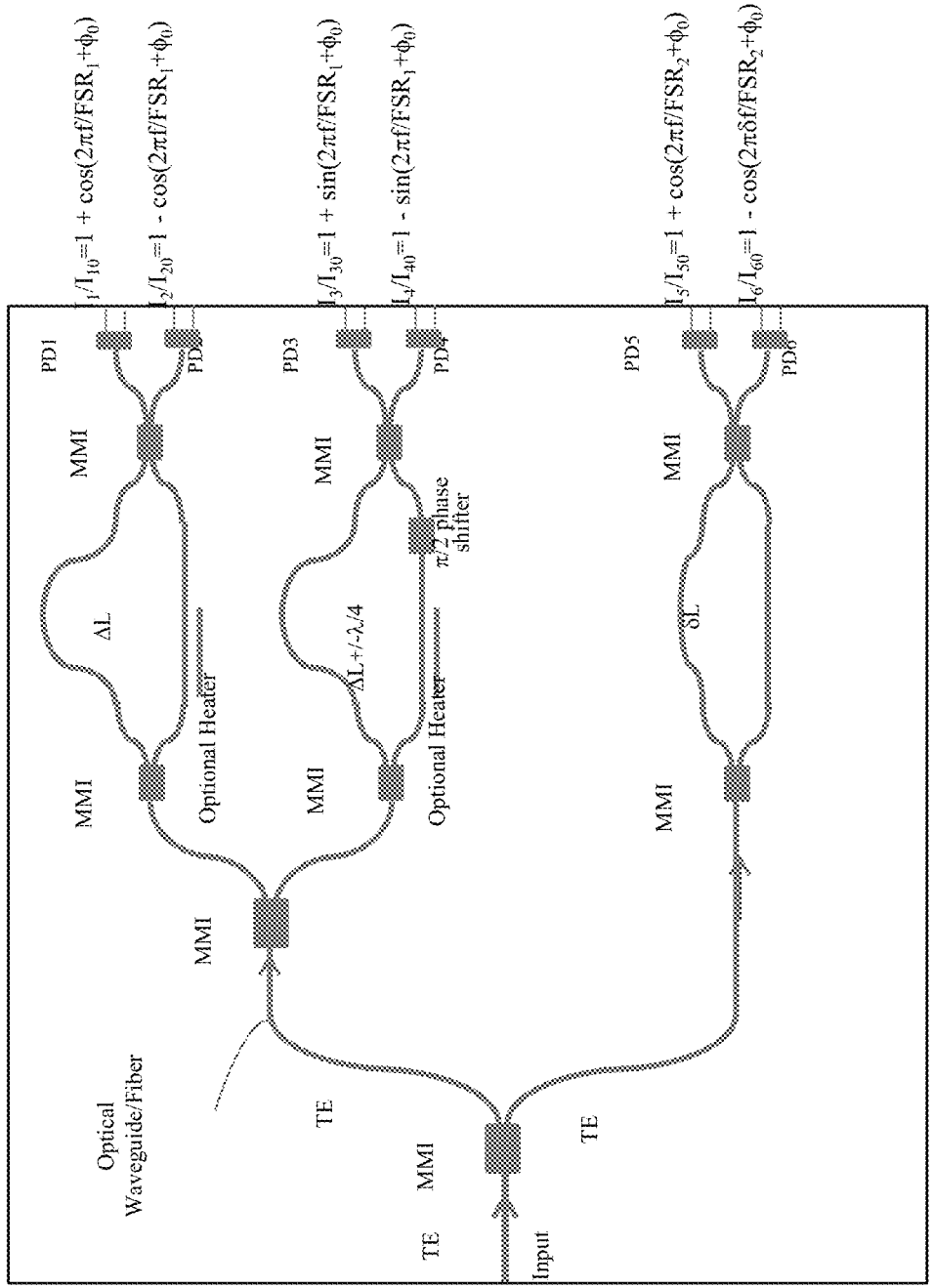

Fig. 6 shows an example of a sine/cosine optical frequency detector combining a pair of Mach-Zehnder interferometers of a large free spectral range ($FSR_1 = c/\Delta L$) with the pair of interferometers of small free spectral range ($FSR_2 = c/\delta L$) to enable absolute optical frequency detection. There are 8 optical couplers are used and are shown in examples of 2x2 MMI couplers

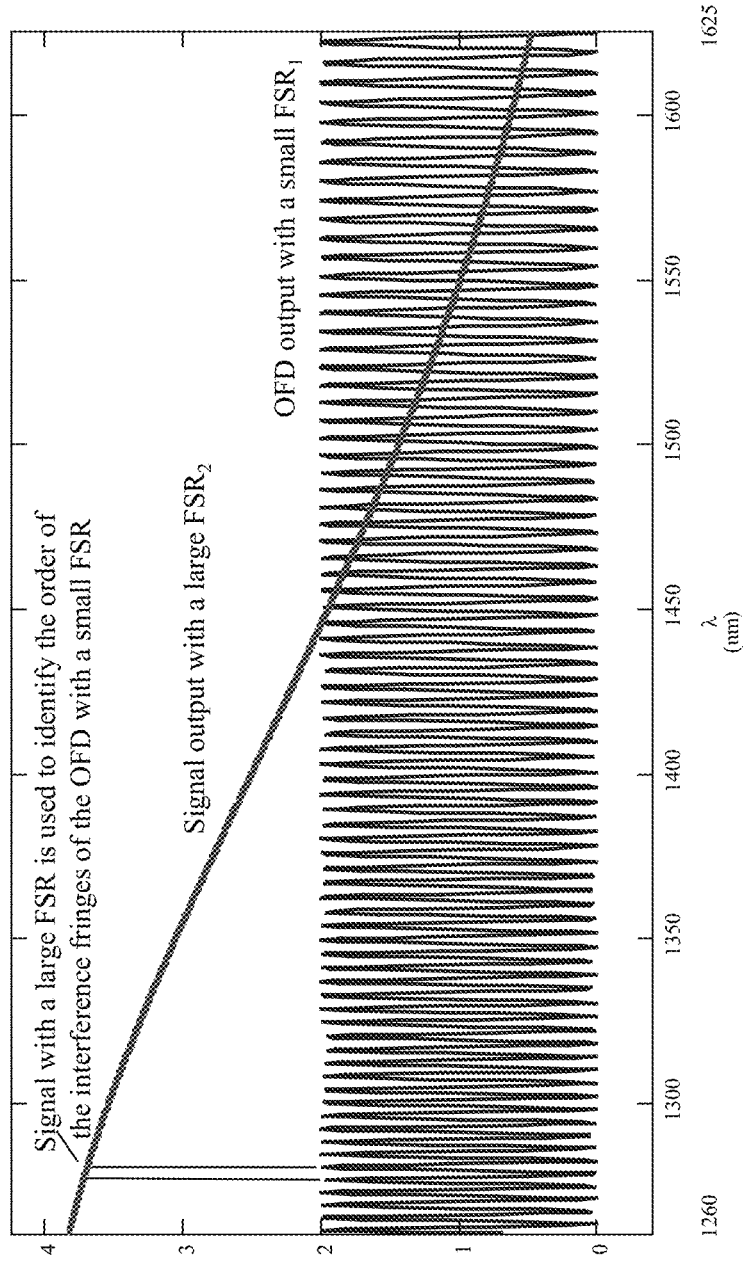
Fig. 7 shows an example of the signal profile by using the combination of an optical frequency detector (OFD) of a large FSR and an OFD of a small FSR described in Fig 5 for making an absolute frequency detector.

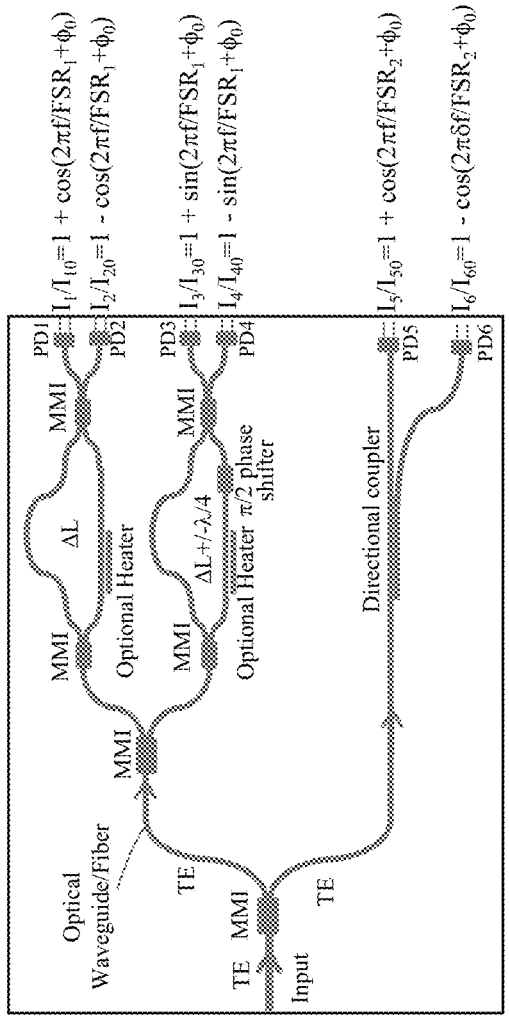
Fig. 8 shows an example of a sine/cosine optical frequency detector combining a pair of Mach-Zehnder interferometers of small free spectral range ($FSR_1 = c/\delta L$) with a directional coupler based wavelength division multiplexer (WDM) to enable absolute optical frequency detection.

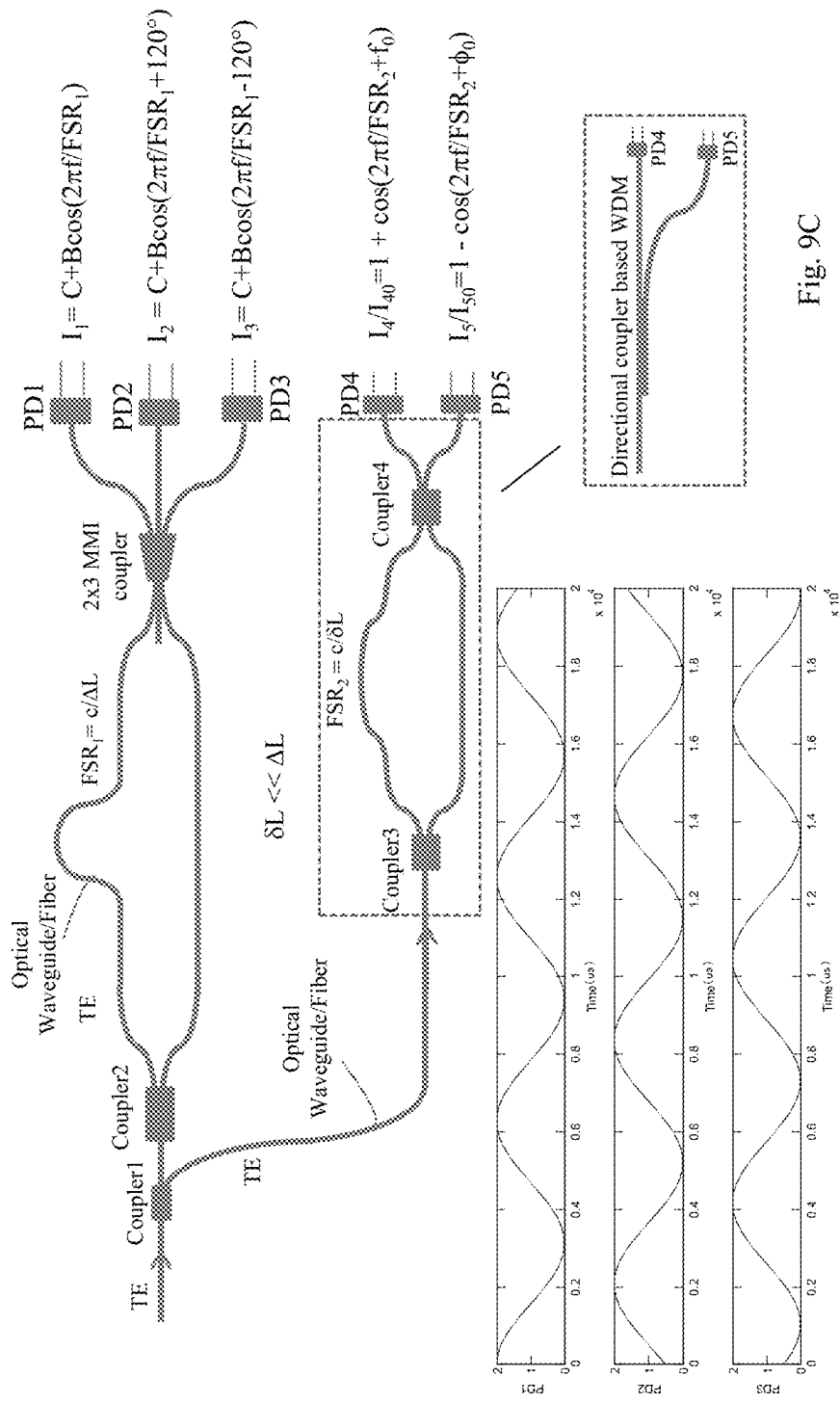
Fig. 9 includes Figs. 9A, 9B and 9C to show an example of a sine/cosine optical frequency detector using 4 2x2 coupler and one 2x3 MMI coupler

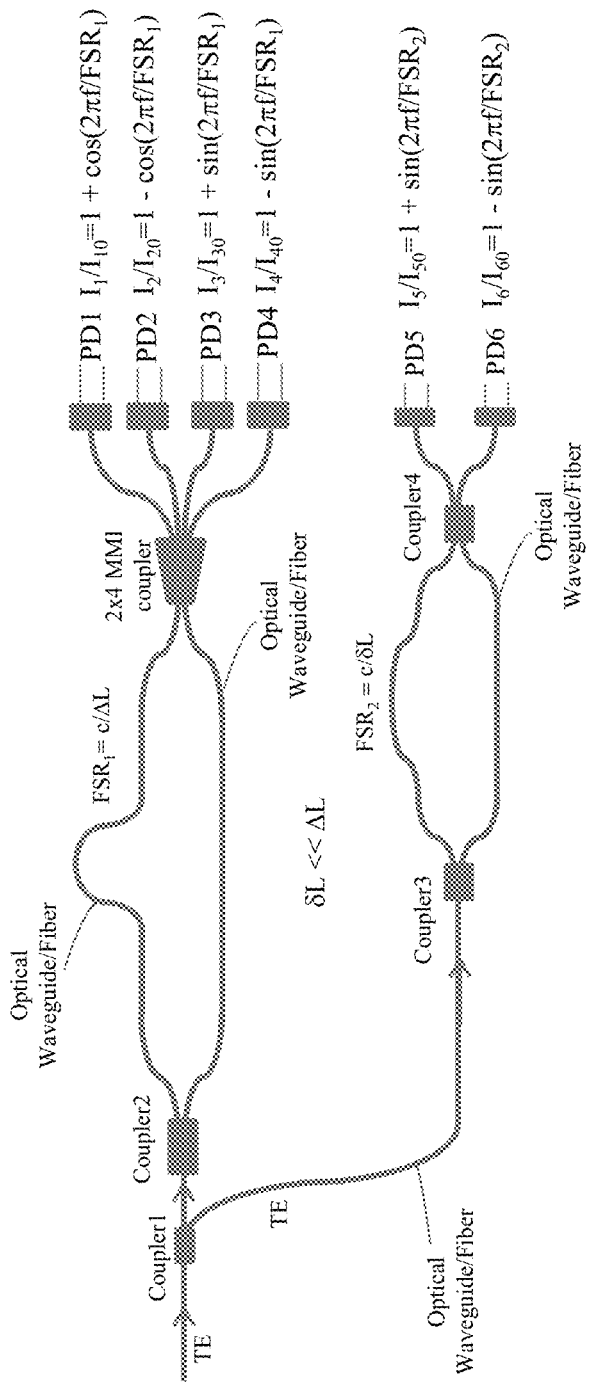
Fig. 10 is an example of an embodiment of a sine/cosine optical frequency detector using a 2x4 MMI coupler to replace the 2x3 MMI coupler in the sine/cosine optical frequency detector in Fig. 9A. The alternative implementation in FIG. 9C can also be used to implement the device in FIG. 10.

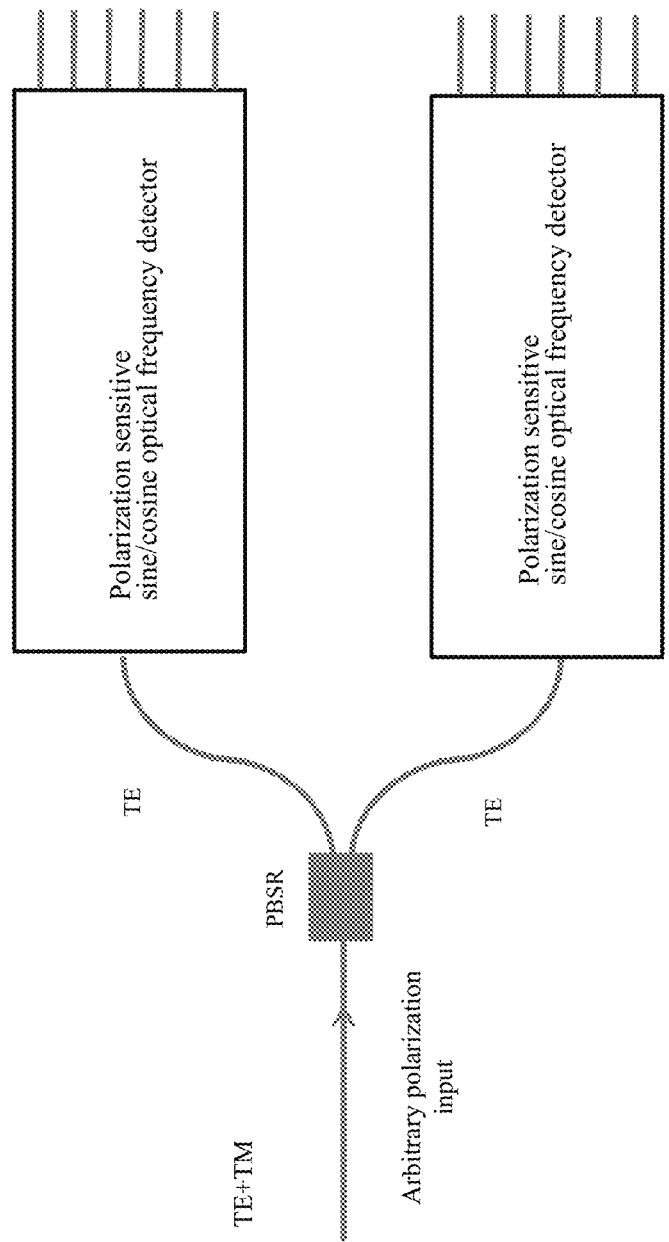
Fig. 11 shows an example of polarization insensitive sine/cosine incremental optical frequency detector based on a 2x2 coupler and a 2x3 MMI coupler

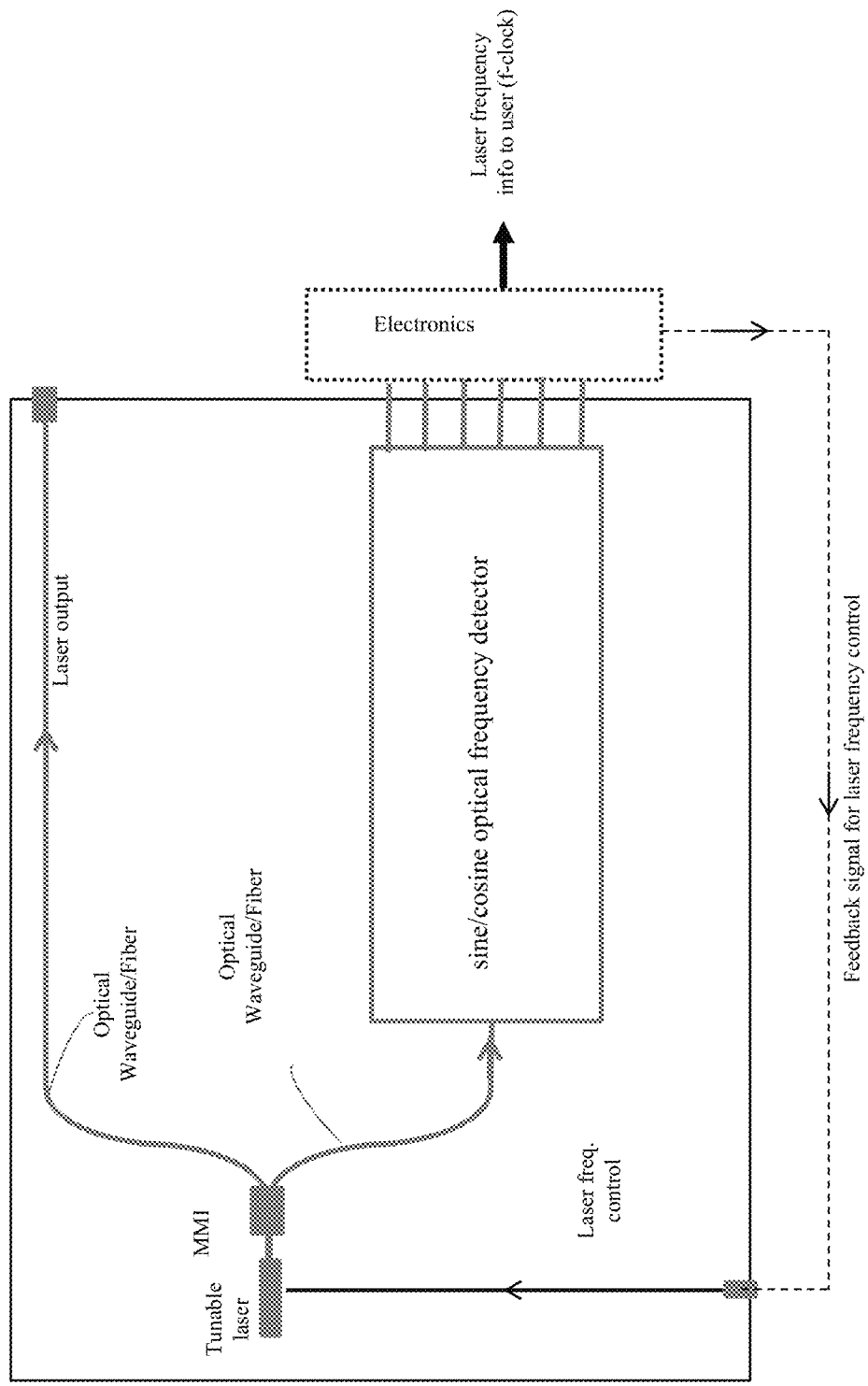
Fig. 12 shows an example of a tunable laser integrated with a sine/cosine optical frequency detector integrated on a PIC chip based on the disclosure of this patent document. The detected frequency can be fed back to control the laser frequency of the tunable laser.

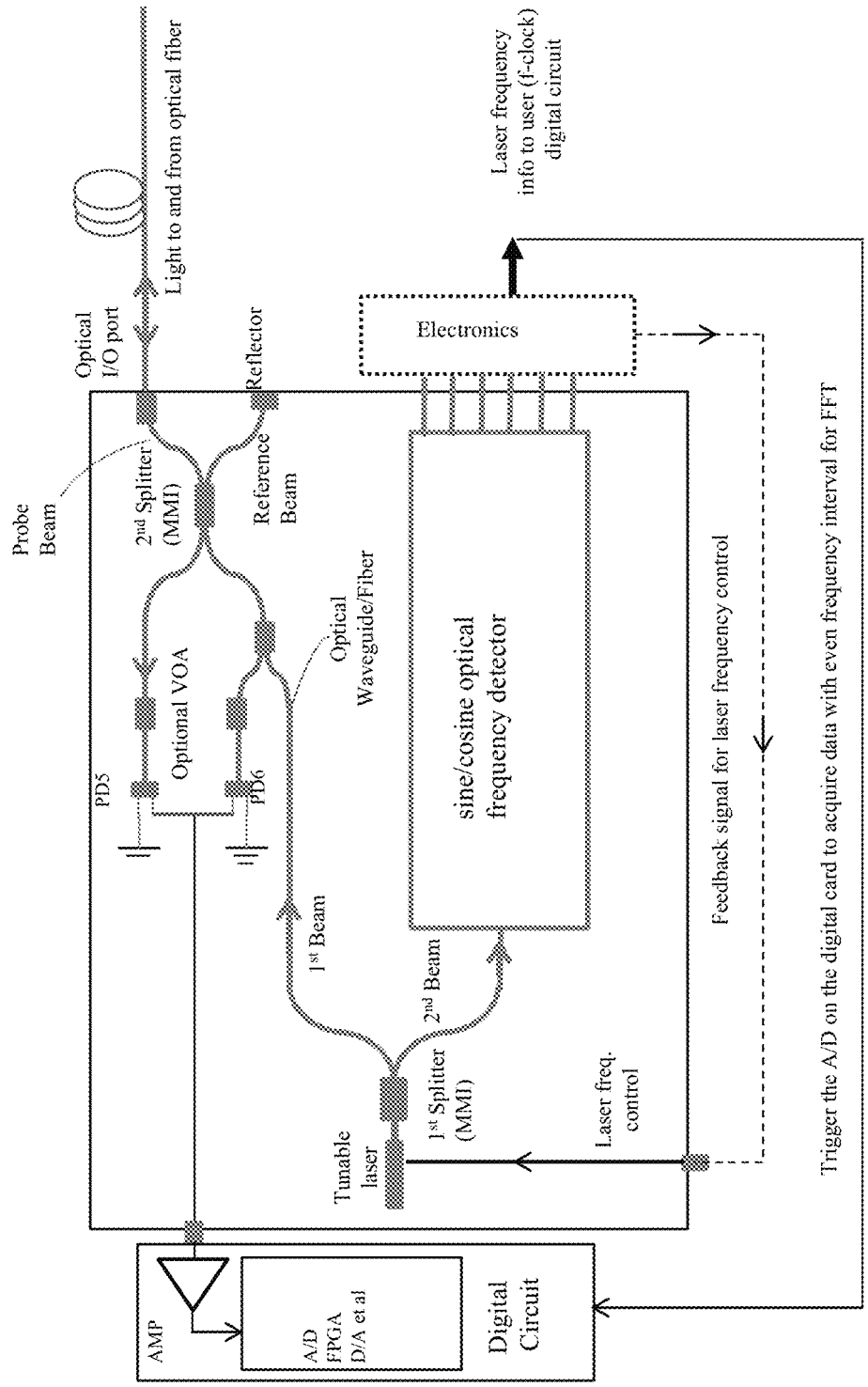
Fig. 13 shows an example of an optical coherence domain reflectometer (OFDR) integrated with a tunable laser, a pair of balanced photodetectors, and a sine/cosine optical frequency detector integrated on a PIC chip based on the disclosure of this patent document.

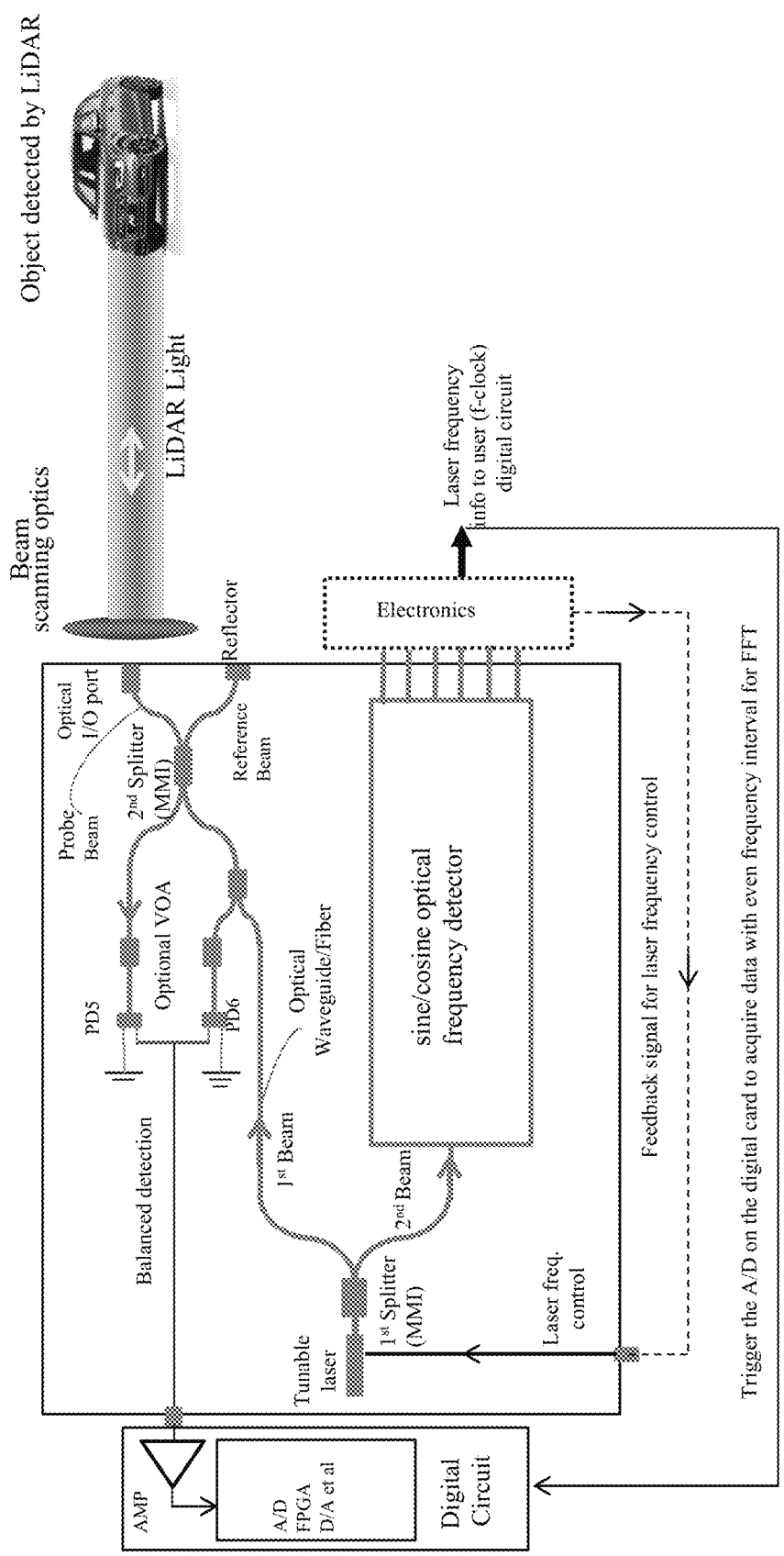
Fig. 14 shows an example of a chirped frequency modulated continuous wave (FMCW) LiDAR integrated with a tunable laser, a pair of balanced photodetectors, and a sine/cosine optical frequency detector integrated on a PIC chip based on the disclosure of this patent document.

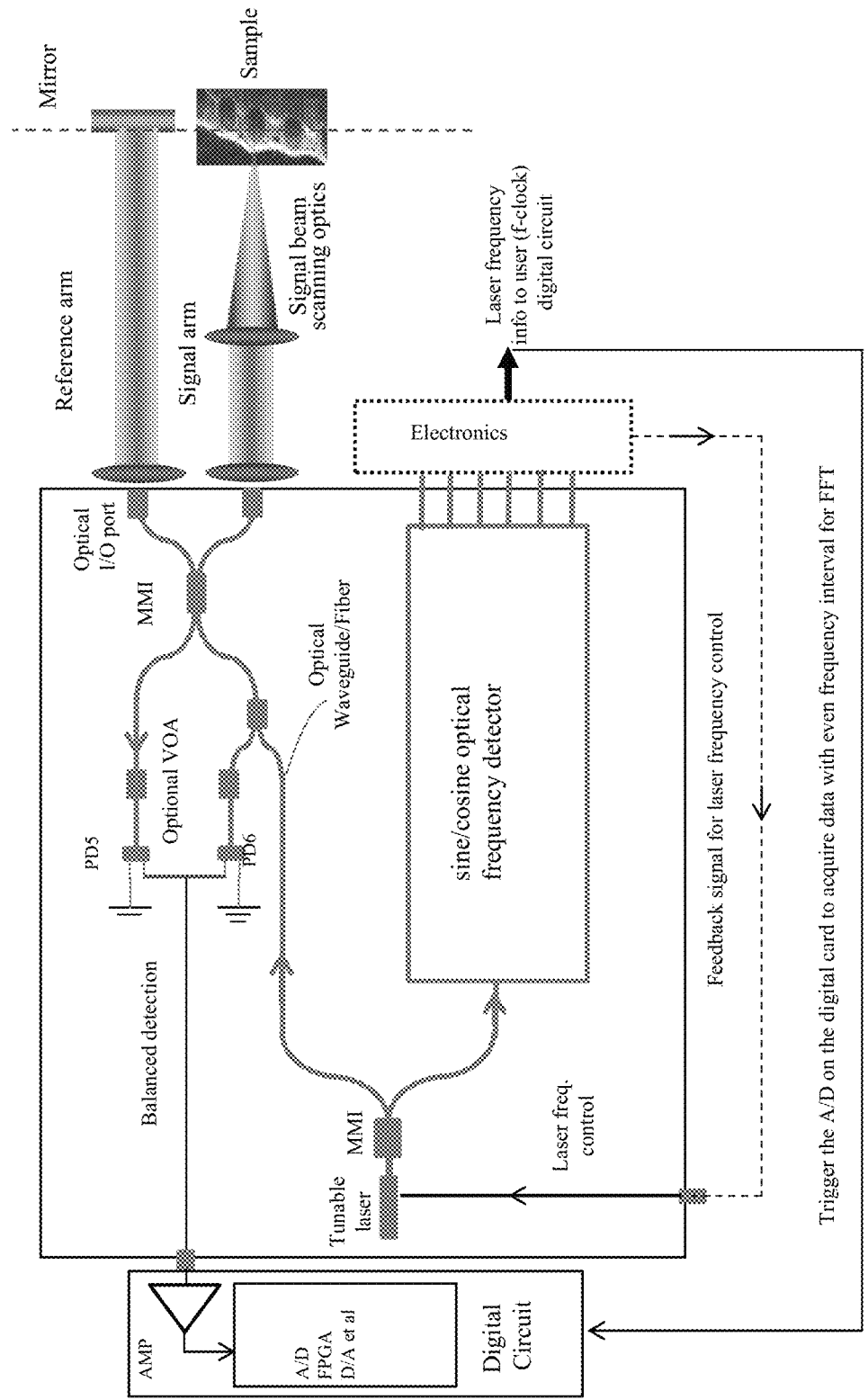
Fig. 15 shows an example of a frequency domain optical coherent tomography (OCT) device integrated with a tunable laser, a pair of balanced photodetectors, and a sine/cosine optical frequency detector integrated on a PIC chip based on the disclosure of this patent document.

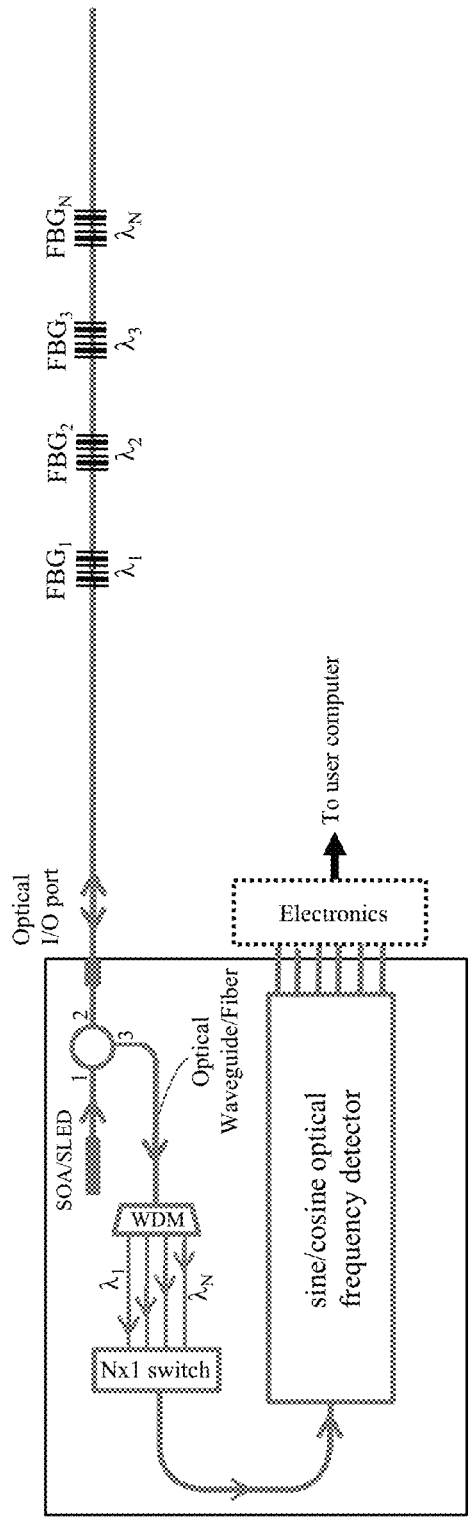
Fig. 16 shows an example of an on-chip fiber Bragg grating (FBG) interrogator by integrating a broad band light source, a wavelength division multiplexer (WDM), a Nx1 switch, and a sine/cosine optical frequency detector integrated on a PIC chip based on the disclosure of this patent document.

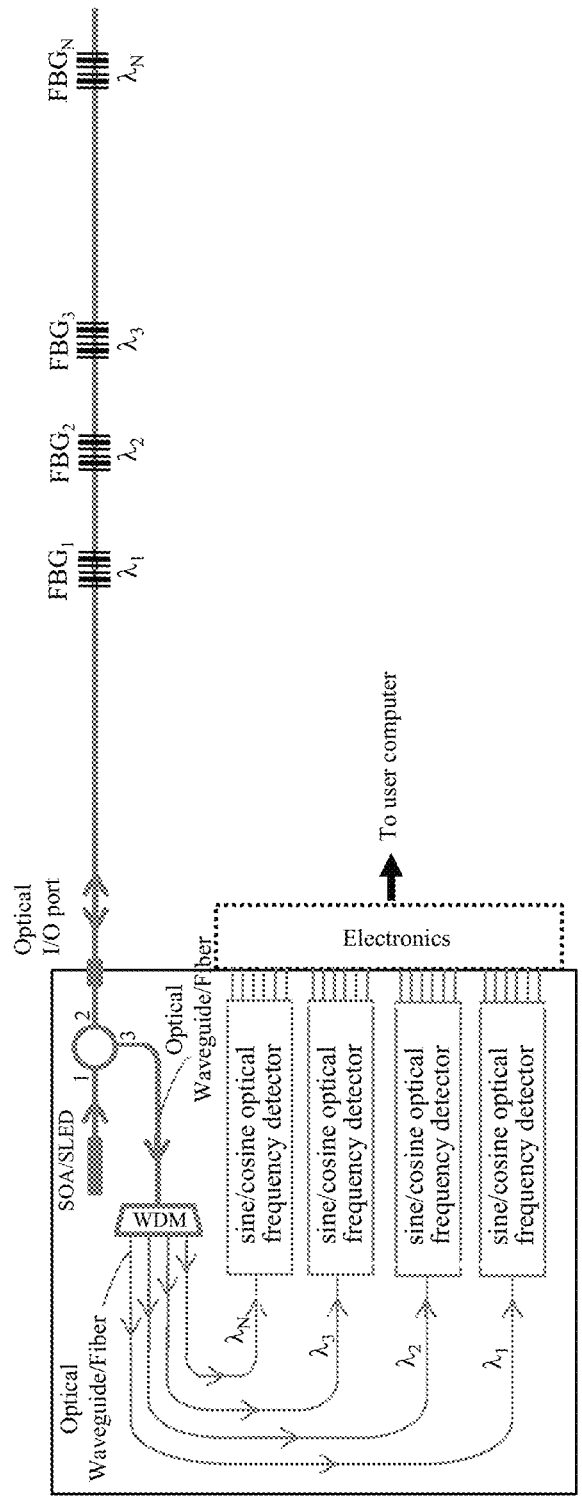
Fig. 17 shows an example of an on-chip fiber Bragg grating (FBG) interrogator by integrating a broad band light source, a wavelength division multiplexer (WDM) with N wavelength channels, and N sine/cosine optical frequency detectors (OFD's) based on the disclosure of this patent document.

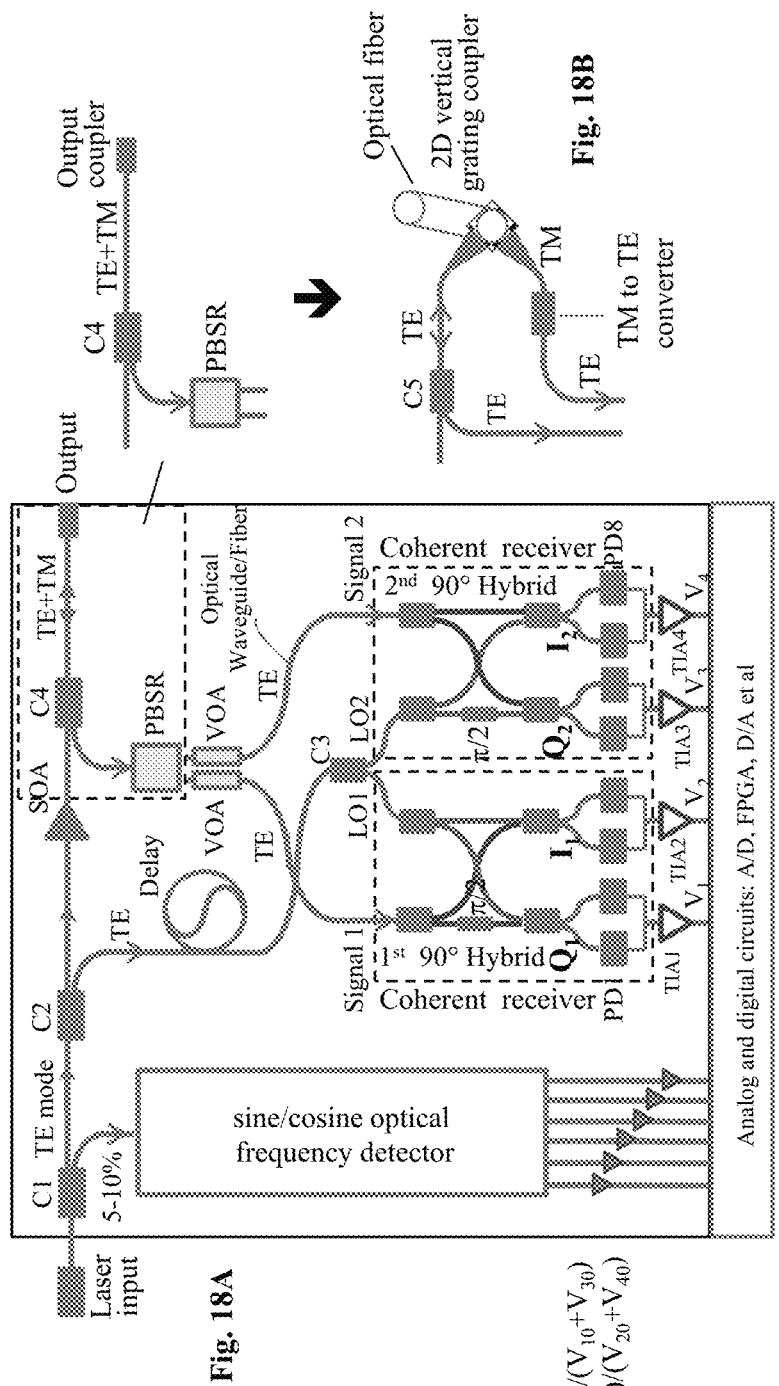
$V_1 = V_{10} \sin\phi(t)$
$V_2 = V_{20} \cos\phi(t)$
$V_3 = V_{30} \sin\phi(t)$
$V_4 = V_{40} \cos\phi(t)$
$\sin[\phi(t)] = (V_1 + V_3)/(V_{10} + V_{30})$
$\cos[\phi(t)] = (V_2 + V_4)/(V_{20} + V_{40})$
Fig. 18 includes Figs. 18A and 18B and shows an example of a PIC interrogator chip for interferometric distributed sensing based on an optical frequency detector (OFD) and a 90° hybrid coherent receiver.

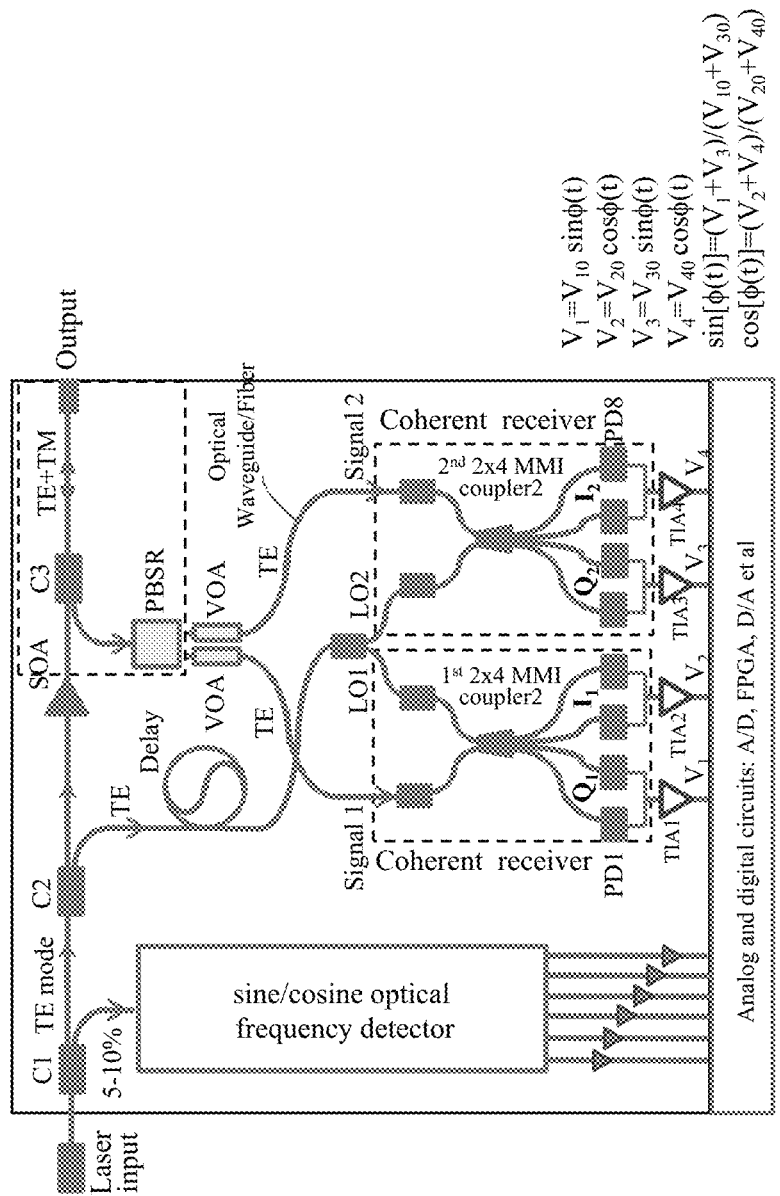
Fig. 19 shows an example of a PIC interrogator chip for interferometric distributed sensing based on an optical frequency detector (OFD) and a 2x4 MMI coupler.

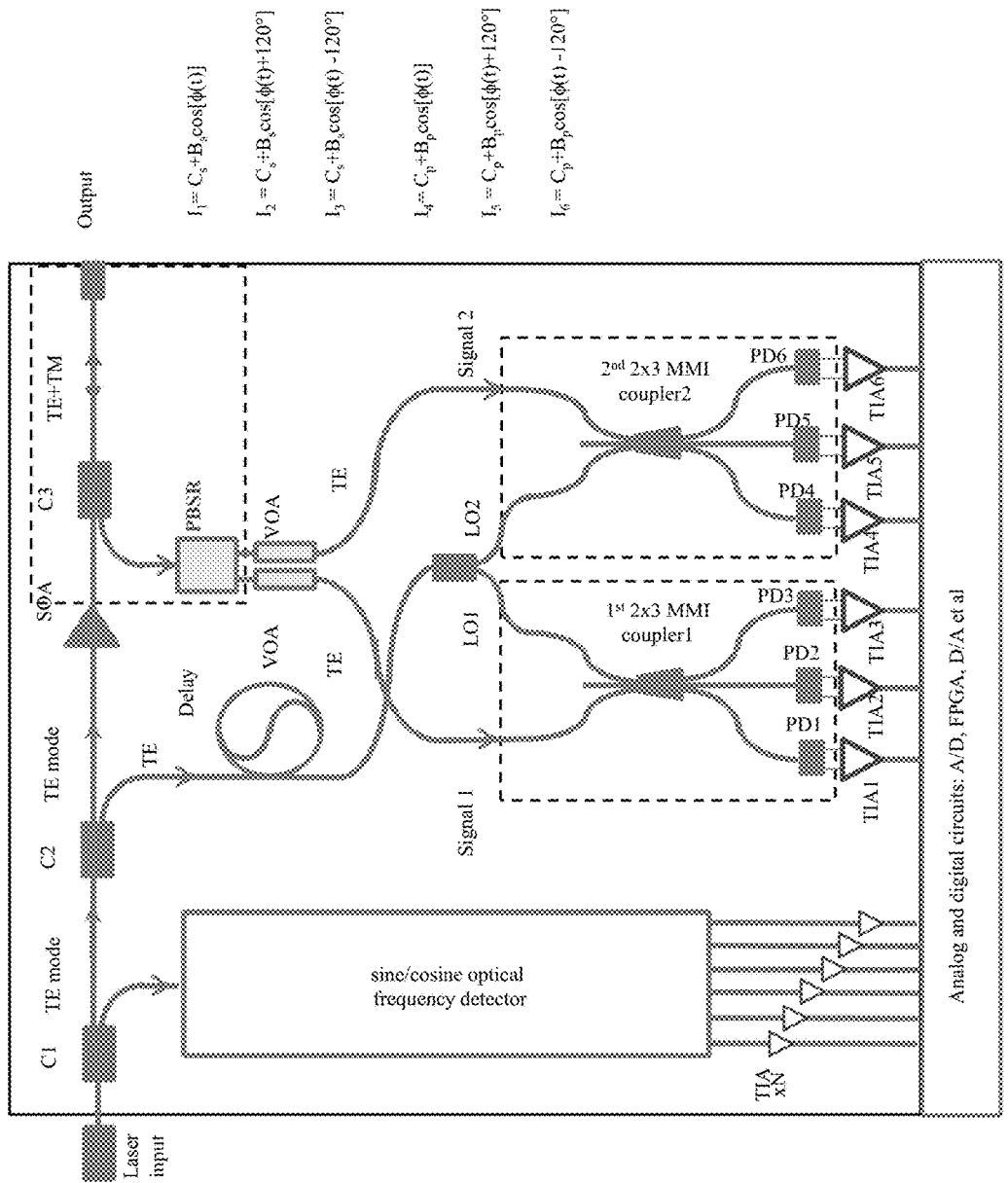
Fig. 20 shows an example of a PIC interrogator chip for interferometric distributed sensing based on an optical frequency detector (OFD) and a 2x3 MMI coupler.

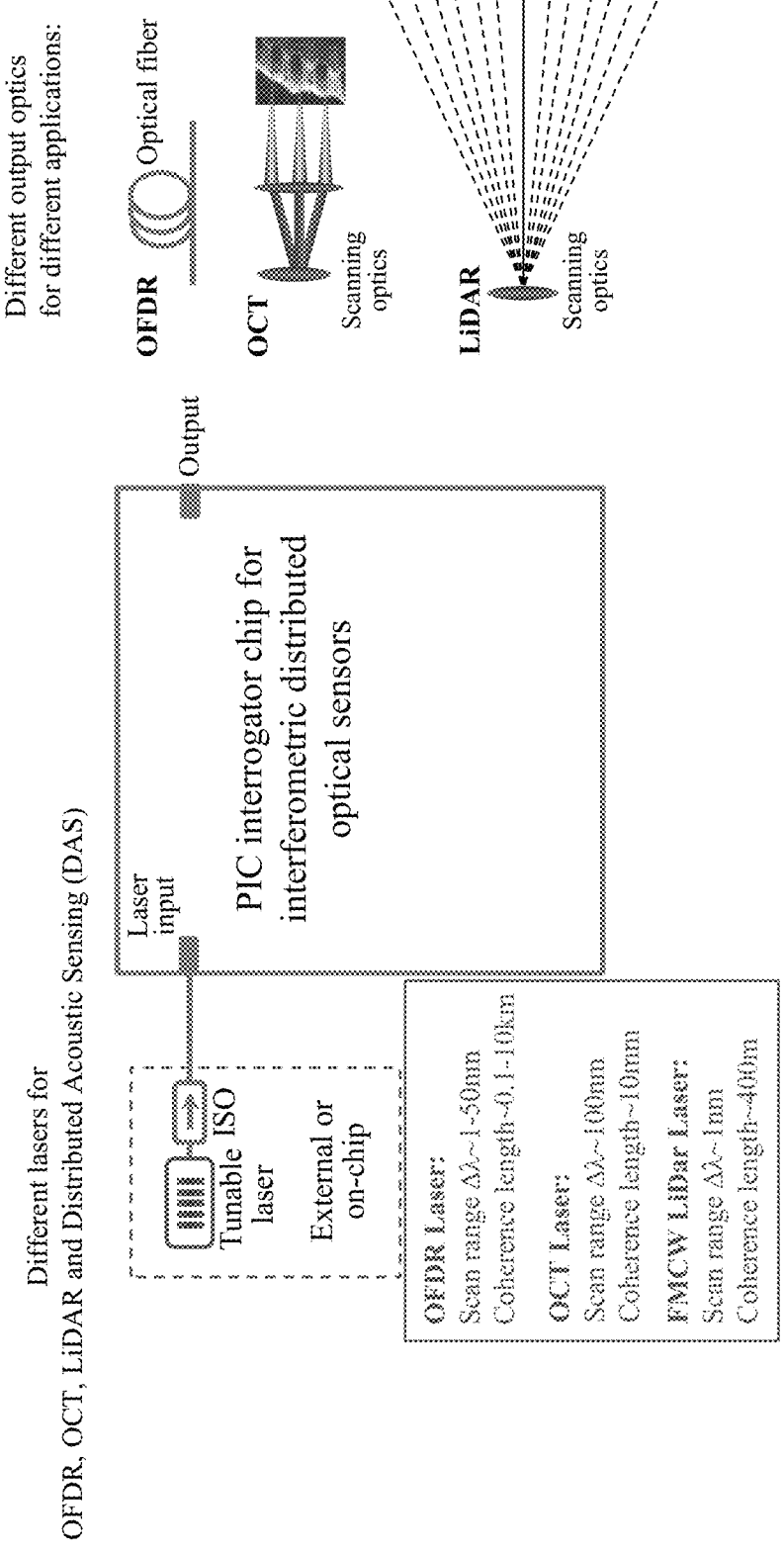
Fig. 21 shows an example of a PIC interrogator chip being used for different distributed sensing applications, including OCT, OFDR, FMCW LiDAR and Distributed Acoustic Sensing (DAS).

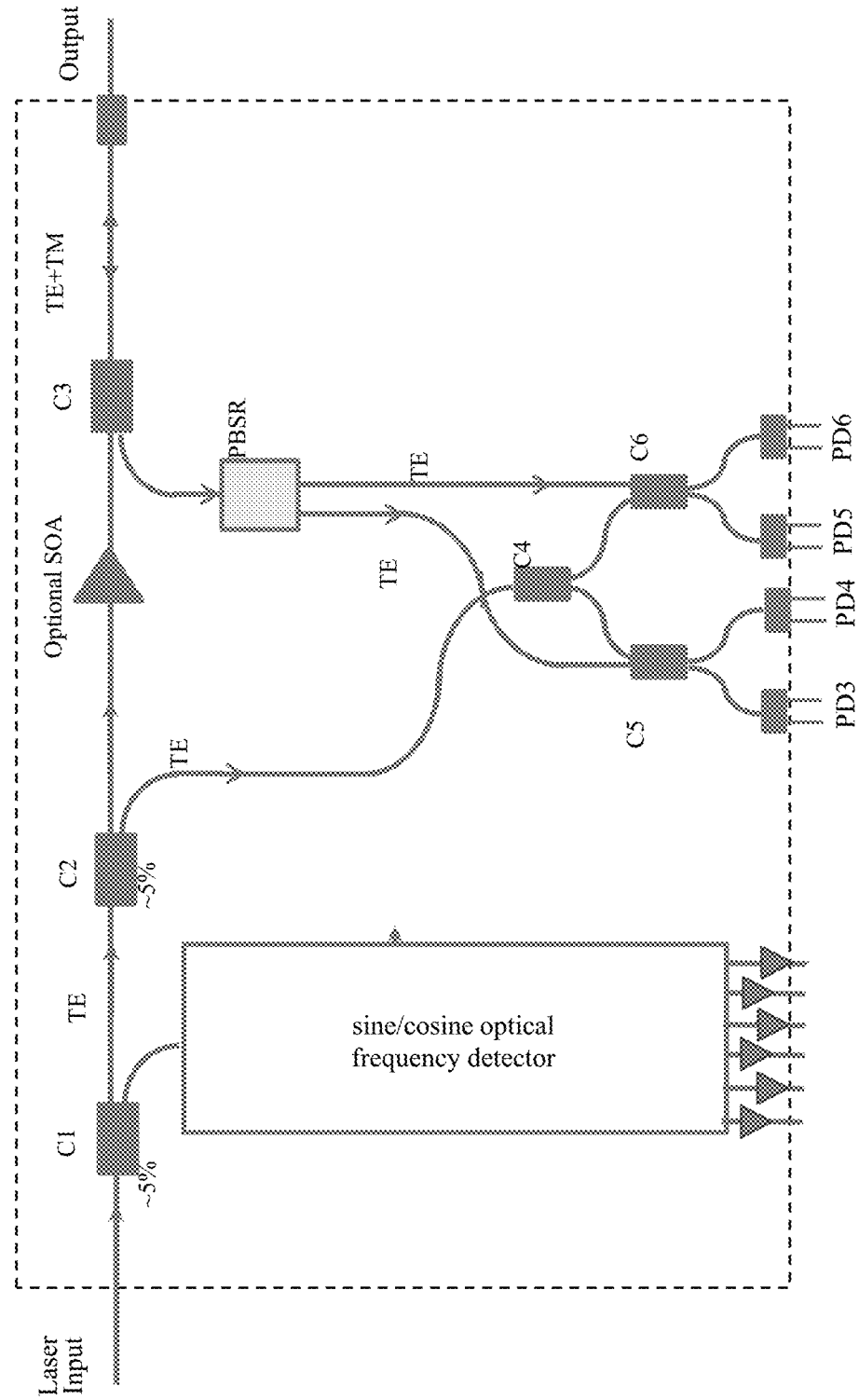
Fig. 22 illustrates one example of an embodiment of a coherent interrogator chip with polarization diversity detection for distributed optical sensing applications, including optical frequency domain reflectometer (OFDR), optical coherence tomography (OCT) and coherent Lidar.

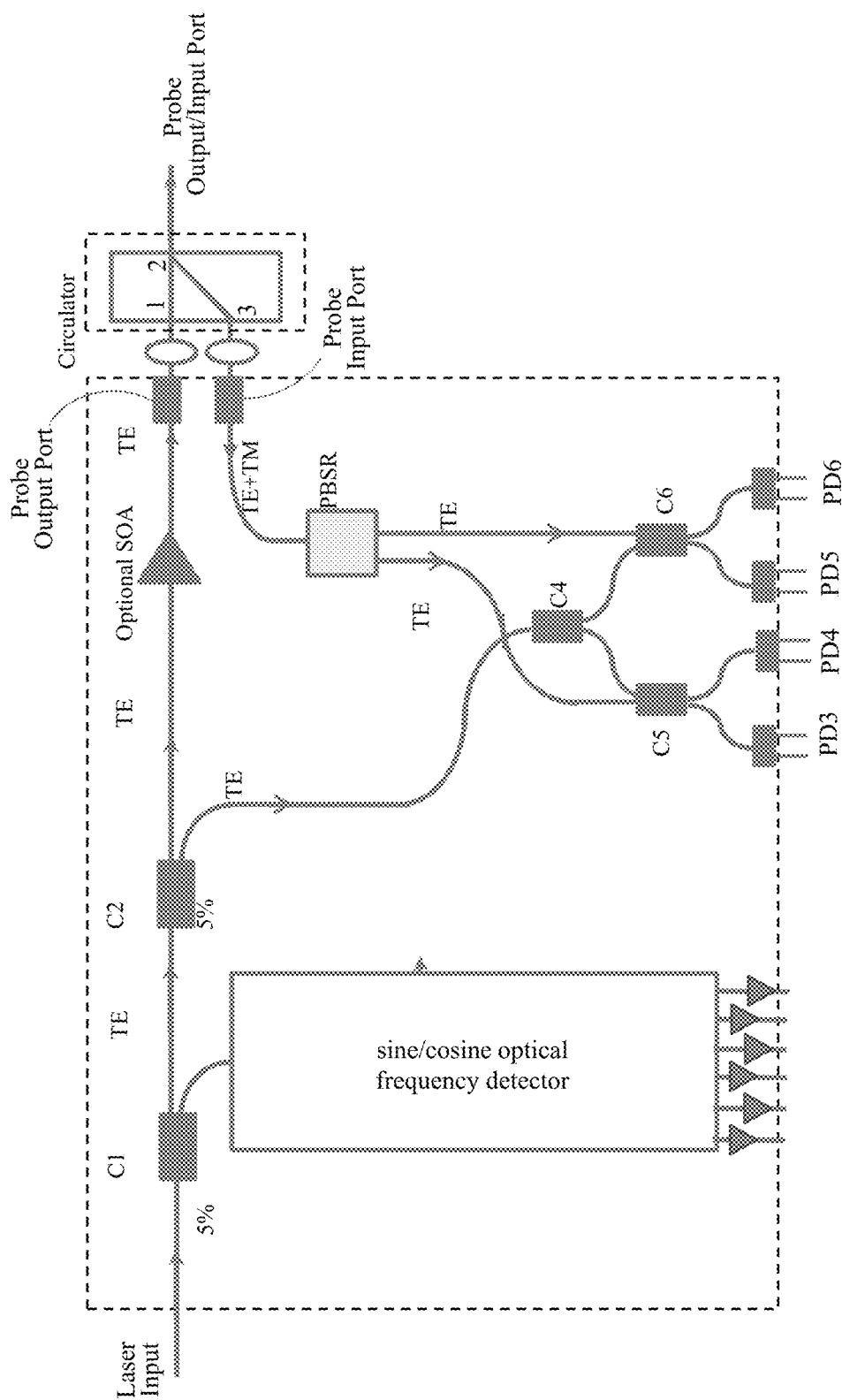

Fig. 23 illustrates another example of an embodiment of a coherent interrogator chip with polarization diversity detection for distributed optical sensing applications, including optical frequency domain reflectometer (OFDR), optical coherence tomography (OCT) and coherent Lidar, in which a free-space micro-circulator is used for reducing the optical insertion loss of the system.

SINE-COSINE OPTICAL FREQUENCY DETECTION DEVICES FOR PHOTONICS INTEGRATED CIRCUITS AND APPLICATIONS IN LIDAR AND OTHER DISTRIBUTED OPTICAL SENSING

PRIORITY CLAIMS AND RELATED PATENT APPLICATIONS

This patent document is a continuation-in-part application of and claims the benefit of priority to U.S. patent application Ser. No. 17/515,050, entitled "SINE-COSINE OPTICAL FREQUENCY DETECTION DEVICES FOR PHOTONICS INTEGRATED CIRCUITS AND APPLICATIONS IN LIDAR AND OTHER DISTRIBUTED OPTICAL SENSING" and filed on Oct. 29, 2021, and published as U.S. Patent Application Publication No. US 2022/0137298 A1 on May 5, 2022. U.S. patent application Ser. No. 17/515,050 further claims priorities to and benefits of (1) U.S. Provisional Application No. 63/163,500, filed on Mar. 19, 2021, and (2) U.S. Provisional Application No. 63/108,175, filed on Oct. 30, 2020. The entire contents of the before-mentioned patent applications are incorporated by reference as part of the disclosure of this application.

TECHNICAL FIELD

This patent document relates to photonics integrated circuit devices capable of measuring optical frequency information of light and the uses of such devices in various applications including light detection and ranging (LiDAR) and others.

BACKGROUND

Many applications involve determining the optical frequency information of light. In some of those applications, it can be important to precisely measure or obtain the optical frequency information with a high resolution and at a high speed. Examples of such applications include laser frequency control, laser frequency analysis, fiber Bragg grating interrogation, frequency trigger signals for optical coherence tomography, optical frequency domain reflectometry, and chirped LiDAR systems for collision prevention for autonomous driving vehicles.

SUMMARY

In one aspect, the disclosed technology can be implemented in photonics integrated circuit (PIC), specifically with silicon photonics, to provide an optical frequency detection device for measuring an optical frequency of light to include an input port that receives light at an optical frequency to be measured; an optical coupler to split the light from the input port into two branches. Light in each branch then enters a Mach-Zehnder interferometer with a certain delay imbalance between the two arms. By design, the delay imbalance in the first interferometer is configured to be one quarter wavelength longer than that of the second interferometer to produce an additional phase difference between the two arms. The two outputs of each interferometer are then detected by two photodetectors to produce two complementary interference signals. The difference between the two complementary interference signals of the first interferometer is a sine function of the optical frequency while the difference between the two complementary interference signals of the second interferometer is proportional to a cosine function of the optical frequency. Using the sine/cosine interpretation algorithm commonly used for the rotation encoders/decoders, any increments in optical frequency can be readily obtained.

In another aspect, an optical frequency detection device can be constructed by adding a third Mach-Zehnder interferometer with a much smaller delay imbalance to the above two Mach-Zehnder interferometer on the same chip to produce a much slow output variation when the optical frequency is changed. Collectively with all three interferometers, the absolute optical frequency can also be determined.

In another aspect, the disclosed technology can be implemented to provide a device for measuring an optical frequency of light to include a substrate and first optical waveguides integrated to and supported by the substrate and coupled to form a first Mach-Zehnder interferometer having two interfering optical arms and an input optical port to receive a first portion of input light at an input optical wavelength that is split into the two interfering optical arms and an output optical port to receive and combine light from the two interfering optical arms to produce two first optical output interferometer signals; two first photodetectors supported by the substrate and located to receive the two first optical output interferometer signals, respectively. The two first photodetectors produce first and second detector signals, respectively, and each of the first and second detector signals varies as a sine function of an optical frequency corresponding to the input optical wavelength. This device also includes second optical waveguides integrated to and supported by the substrate and coupled to form a second Mach-Zehnder interferometer having two interfering optical arms and an input optical port to receive a second portion of the input light which is split into the two interfering optical arms, and an output optical port to receive and combine light from the two interfering optical arms to produce two second output interferometer signals and the second Mach-Zehnder interferometer is structured to have a phase difference between the two interfering arms different by one quarter of the input optical wavelength from a phase difference between the two interfering arms of the first Mach-Zehnder interferometer. This device further includes two second photodetectors supported by the substrate and located to receive the two second optical output interferometer signals, respectively, wherein the two second photodetectors produce third and fourth detector signals, respectively, and wherein each of the third and fourth detector signals varies as a cosine function of the optical frequency corresponding to the input optical wavelength; and a processing module coupled to receive the first, second, third and fourth detector signals and operable to process the first, second, third and fourth detector signals to determine a change in the optical frequency of the input light.

In yet another aspect, the disclosed technology can be implemented to provide a device for measuring an optical frequency of light to include a substrate; a beam splitter supported by the substrate and located in an optical path of the input light to split the input light into a first input beam of the input light and a second input beam of the input light; and a first optical coupler supported by the substrate and located to receive the first input beam and to split the first input beam into the first and second portions of the input light. This device includes first optical waveguides integrated to and supported by the substrate and coupled to form a first Mach-Zehnder interferometer having two interfering optical arms and an input optical port to receive the first portion of input light and split the received first portion into different beams in the two interfering optical arms and an output optical port to receive and combine light from the two interfering optical arms to produce three or more first optical output interferometer signals in different phases relative to one another; |three or more first photodetectors supported by the substrate and located to receive the three or more first optical output interferometer signals, respectively. The first photodetectors produce three or more first detector signals, respectively, and each of the first detector signals varies as a sine or cosine function of an optical frequency corresponding to the input optical wavelength. This device also includes second optical waveguides integrated to and supported by the substrate and coupled to form a waveguide device to receive the second input beam from the beam splitter and to produce two output signals of complementary wavelength responses; and two second photodetectors supported by the substrate and located to receive the two output signals of the waveguide device, respectively. The two second photodetectors produce two second detector signals, respectively, and wherein each of the second detector signals varies as a cosine function of the optical frequency corresponding to the input optical wavelength. A processing module is further included in this device and is coupled to receive the first and second detector signals and operable to process the first and second detector signals to determine an absolute value of, and a change in, the optical frequency of the input light.

The above devices and PIC optical frequency detectors based on the disclosed technology can be implemented to enable on-chip integration of coherence Lidar, optical coherence tomography (OCT), optical frequency domain reflectometer (OFDR), and fiber Bragg grating (FBG) interrogator requiring fast and precise optical frequency detection. In addition, precise laser frequency control with arbitrary waveforms can also be implemented with the optical frequency detector disclosed in this application.

The above and other aspects and their implementations of the disclosed technology are described in greater detail in the drawings, the description and the claims.

BRIEF DESCRIPTION OF DRAWINGS

FIG. 1 includes FIGS. 1a and 1b illustrating an example of a prior art k-clock (f-clock) generator based on a Mach-Zehnder interferometer for generating equally-spaced frequency markers. FIG. 1a shows an example of a prior art incremental frequency detector using a Mach-Zehnder interferometer of a large delay imbalance between the two arms. Such an interferometer may also suffer polarization fading caused by the polarization variations in the long fiber delay. FIG. 1b shows the relationship between measurement range and frequency measurement resolution. In principle, for the unambiguous detection of frequency increment, the detection range is limited to half of the free spectral range (FSR). However, a larger FSR results in a lower frequency slope and therefore worse measurement resolution. Conversely, a better frequency measurement resolution requires small FSR or a large delay imbalance between the two arms. For detecting a unidirectional optical frequency sweep, one may simply get zero-crossing frequencies which have equal frequency spacing for certain applications.

FIG. 2 is an example of a sine/cosine optical frequency detector (OFD). Light inputting to the frequency detector is split into two branches, with each of them entering a Mach-Zehnder interferometer. The top interferometer has a delay imbalance of $\Delta L$ between two optical branches within the interferometer, while the bottom interferometer has a delay imbalance of $\Delta L +/- \lambda/4$ between two optical branches within the interferomter. Considering the fabrication tolerances, in some implementations, the nominal delay imbalances of the two interferometers can be made the same and the $\lambda/4$ difference between imbalances of the two interferometers can be induced by a $\pi/2$ phase shifter. An optional phase turning device such as an optical heater may be implemented in at least one of the two optical arms to fine tune the interferometer. Such an OFD may be integrated onto a photonics integrated circuit (PIC) over a substrate where optical waveguides are used to guide light from component to component.

FIG. 3 is an example of a polarization insensitive sine/cosine optical frequency detector. Input light is separated by a polarization beam splitter (PBS) into two separate beams in TE and TM modes that are directed into TE and TM branches of waveguides, respectively. The TE branch is coupled to a frequency decoder made with two Mach-Zenhder interferometers described in FIG. 2 where an optical beam splitter, e.g., a multi-mode interferometer (MIMI) device, is used to split the TE mode light in the TE branch into two separate beams in the frequency decoder. In the TM branch, the TM mode is converted to TE mode with a mode converter into a TE waveguide before entering a second frequency detector made of two Mach-Zenhder interferometer described in FIG. 2. Under this design, no matter what the input polarization is, sufficient optical power can be present in either the upper or lower branch of the device for obtaining the incremental optical frequency information. In other implementations, the PBS and the TM to TE converter may be replaced with a polarization splitter and rotator (PBSR).

FIG. 4 is an example of an analog circuit for calculating the instant phase or frequency of the light signal.

FIG. 6 is an example of an embodiment of the sine/cosine optical frequency detector (OFD) based on the disclosed technology in this patent document, which combines a Mach-Zehnder interferometer (MZI) of a large free spectral range (FSR) ($FSR_2=c/\delta L$) with a pair of MZIs of a small FSR ($FSR_1=c/\Delta L$) to enable absolute optical frequency detection. Input light is split by an input MMI into two beams guided by two waveguides. The upper waveguide branch goes to the OFD described in FIG. 2 and the lower waveguide branch goes to another Mach-Zehnder interferometer with a much smaller delay imbalance of $\delta L$ of the two optical arms that provides a much larger free spectral range ($FSR_2$).

FIG. 7 is an example for using the combination of an optical frequency detector (OFD) of a large FSR an OFD of a small FSR described in FIG. 6 for making an absolute frequency detector. The value of the large FSR is chosen such that in the frequency (or wavelength) range of interest, the detected optical power change is limited in the first quarter of the cosine function for the coarse absolute optical frequency measurement, as shown in the figure. Within this quarter period, there is a large amount of periods produced by the OFD of the small FSR. So long as the frequency resolution of the OFD with the large FSR is sufficiently fine to resolve a period of the OFD of the small FSR, the absolute frequency of the light source can be obtained unambiguously.

FIG. 8 is an example of an embodiment of the sine/cosine optical frequency detector capable of performing absolute optical frequency detection based on combining a pair of Mach-Zehnder interferometers of a small free spectral range ($FSR_1=c/\delta L$) with a directional coupler based wavelength division multiplexer (WDM) to enable absolute optical frequency detection. Input light is polarized (e.g., in the TE polarization mode) and is split by an input MMI into two TE polarized beams that are directed into two waveguides. The upper waveguide branch is coupled the OFD described in FIG. 2 while the lower waveguide branch is coupled to a coarse WDM made with a directional coupler with a large free-spectral range ($FSR_2$).

FIG. 9 includes FIGS. 9A, 9B and 9C. FIG. 9A is an example of an embodiment of the sine/cosine optical frequency detector which combines an interferometer of a small FSR ($FSR_1=c/\Delta L$, e.g., on the order of GHz) made and a MZI with a much larger FSR ($FSR_2=c/\delta L$, e.g., on the order of thousands GHz) for absolute optical frequency detection. FIG. 9B shows examples of outputs from the three photodetectors of the 2×3 MMI coupler in FIG. 9A. FIG. 9C illustrates an example of another implementation of the sine/cosine optical frequency detector in FIG. 9A where a directional coupler based WDM is used to replace the MZI device with the larger FSR.

FIG. 10 is an example of an embodiment of a sine/cosine optical frequency detector using a 2×4 MIMI coupler to replace the 2×3 MIMI coupler in the sine/cosine optical frequency detector in FIG. 9A. The alternative implementation in FIG. 9C can also be used to implement the device in FIG. 10.

FIG. 11 shows an example of a configuration for minimizing polarization sensitivity of a sine/cosine optical frequency detector disclosed in this patent document. In general $SiO_2$ based photonics integrated circuits (PIC) are not polarization sensitive, while Si and SiN based PICs may be polarization sensitive. The incoming lightwave with an arbitrary polarization is split by a polarization splitter and rotator (PB SR) with the TM polarization rotated into the TE polarization. Two identical OFD's described FIG. 8-10 are included to simultaneously detect the optical frequency in the two arms to eliminate the polarization sensitivity, similar to the design in FIG. 3.

FIG. 12 is an example of a tunable laser integrated with any of the sine/cosine optical frequency detectors disclosed above on a PIC chip. The detected frequency can be fed back to control the laser frequency as an optical frequency synthesizer. This device can be used to 1) stabilize the laser output to a fixed frequency in the range; 2) generate a frequency ramp with a high linearity; or 3) generate an arbitrary frequency variation waveform.

FIG. 13 is an example of an optical coherence domain reflectometer (OFDR) integrated with a tunable laser, a pair of balanced photodetectors (PD5 and PD6 with an optional variable optical attenuator (VOA) in front of at least one photodetector), and a sine/cosine optical frequency detector integrated on a PIC chip based on the disclosure of this patent document. In an OFDR system, the precisely known frequency increment is needed for obtaining the accurate distance information of the object. An optical coherence domain reflectometer (OFDR) may be implemented by using an optical interferometer (e.g., a Mach-Zenhder interferometer as shown in FIG. 1 or Michelson interferometer) with a large delay imbalance (e.g., on the order of 100 meters in some cases) to generate f-clock representing the frequency increment for triggering the data acquisition. Such a large interferometer is difficult to be integrated on a PIC chip. The OFD in FIG. 13 can use the laser frequency control based on the detection by the OFD to obtain the same frequency resolution with only few mm delay imbalance and therefore enable the direct integration on a PIC chip. Alternatively, the obtained frequency information may also be used to control the tunable laser for generating ultra-linear frequency modulation.

FIG. 14 is an example of a chirped LiDAR integrated with a tunable laser, a pair of balanced photodetectors (PD5 and PD6 with an optional variable optical attenuator (VOA) in front of at least one photodetector), and a sine/cosine optical frequency detector integrated on a PIC chip based on the disclosure of this patent document. In such a LiDAR system, the precisely known frequency increment is needed for obtaining the accurate distance information of the object. A LiDAR may be implemented by using an optical interferometer (e.g., a Mach-Zehnder interferometer as shown in FIG. 1 or Michelson interferometer) with a large delay imbalance (e.g., on the order of 100 meters in some cases) to generate f-clock representing the frequency increment for triggering the data acquisition. Such a large interferometer is difficult to be integrated on a PIC chip. The OFD detector in FIG. 14 can obtain the same frequency resolution with only few mm delay imbalance and therefore enable the direct integration on a PIC chip. Alternatively, the obtained frequency information may also be used to control the tunable laser for generating ultra-linear frequency modulation.

FIG. 15 is an example of a frequency domain OCT integrated with a tunable laser, a pair of balanced photodetectors, and a sine/cosine optical frequency detector integrated on a PIC chip based on the disclosure of this patent document. In such a frequency domain OCT system, the precisely known frequency increment is needed for obtaining the accurate distance information of the object. An OCT system may be implemented using an optical interferometer (e.g., a Mach-Zehnder interferometer in FIG. 1 or Michelson interferometer) with a large delay imbalance to generate f-clock representing the frequency increment for triggering the data acquisition. Such a large interferometer is difficult to be integrated on a PIC chip. Alternatively, the obtained frequency information may also be used to control the tunable laser for generating ultra-linear frequency modulation.

FIG. 16 is an example of an on-chip fiber Bragg grating (FBG) interrogator by integrating a broad band light source, a wavelength division multiplexer (WDM), a N×1 switch, and a sine/cosine optical frequency detector integrated on a PIC chip based on the disclosure of this patent document. Probe light from a broadband light source is injected into the fiber with different FBGs at different optical wavelengths and different locations in the fiber to reflect light of different wavelengths. A wavelength division multiplexing (WDM) device is provided to receive the reflected light and to separate the received light into different optical signals at the different wavelengths as different WDM channels. An optical N×1 switch is used to switch the light of each WDM channel to the OFD. The wavelength shift of the reflected light at a particular WDM channel caused by the temperature or strain in the FBG can be precisely detected by the OFD and the wavelength shifts at different WDM channels can be measured sequentially.

FIG. 17 is an example of an on-chip FBG interrogator by integrating a broad band light source, a wavelength division multiplexer (WDM), and N sine/cosine optical frequency detectors based on the disclosure of this patent document. Different WDM channels separated by the WDM device are directed in different optical waveguides to different sine/cosine optical frequency detectors, respectively, with one WDM channel per WDM device. The wavelength shift of the reflected light caused by the temperature or strain in each FBG can be precisely detected by the corresponding OFD. In some implementations, the WDM can be made with an arrayed waveguide grating (AWG). The wavelength shifts at different WDM channels can be measured simultaneously by the different sine/cosine optical frequency detectors.

FIG. 18 incudes FIGS. 18A and 18B showing an example of a PIC interrogator chip for interferometric distributed sensing based on any of the sine/cosine optical frequency detectors disclosed above on a PIC chip and a 90° hybrid coherent receiver. FIG. 18B shows that the PBSR section in FIG. 18A can be replaced with a 2D vertical grating for achieving polarization splitting.

FIG. 19 is an example a PIC interrogator chip for interferometric distributed sensing based on any of the OFD's disclosed above and a 2×4 MMI coupler.

FIG. 20 is an example a PIC interrogator chip for interferometric distributed sensing based on any of the OFD's disclosed above and a 2×3 MMI coupler based on the basic structure in FIG. 18 while using a coherent receiver based a 2×3 MMI coupler to replace the 90° hybrid coherent receiver in FIG. 18A. The two outputs of the returned light from the PB SR are made to interfere with the reference light from C2 to produce two pairs of interference signals. Similar to FIG. 18B, the PBSR section can be replaced with a 2D vertical grating coupler to separate the two orthogonal polarization components.

FIG. 21 Illustrates an example of a PIC interrogator chip disclosed in FIG. 18 to FIG. 20 for different distributed sensing applications, including an optical coherent tomography (OCT) device, optical coherence domain reflectometer (OFDR), and frequency modulated continuous wave (FMCW) LiDAR. As shown in the left and right hand sides of the PIC chip, for different applications, the lasers at the input of the chip and the optics at the output of the chip are different. The box on the left shows the requirements of the laser parameters for different applications, while the drawings on the right showing the optics for OFDR, OCT, and LiDAR applications. Because the same chip can be used for three different sensing applications, the development cost can be shared and the market size for the chip can be significantly increased.

FIG. 22 illustrates one example of an embodiment of a coherent interrogator chip with polarization diversity detection for distributed optical sensing applications, including optical frequency domain reflectometer (OFDR), optical coherence tomography (OCT) and coherent Lidar.

FIG. 23 illustrates another example of an embodiment of a coherent interrogator chip with polarization diversity detection for distributed optical sensing applications, including optical frequency domain reflectometer (OFDR), optical coherence tomography (OCT) and coherent Lidar, in which a free-space micro-circulator is used for reducing the optical insertion loss of the system.

DETAILED DESCRIPTION

Figure 5A:
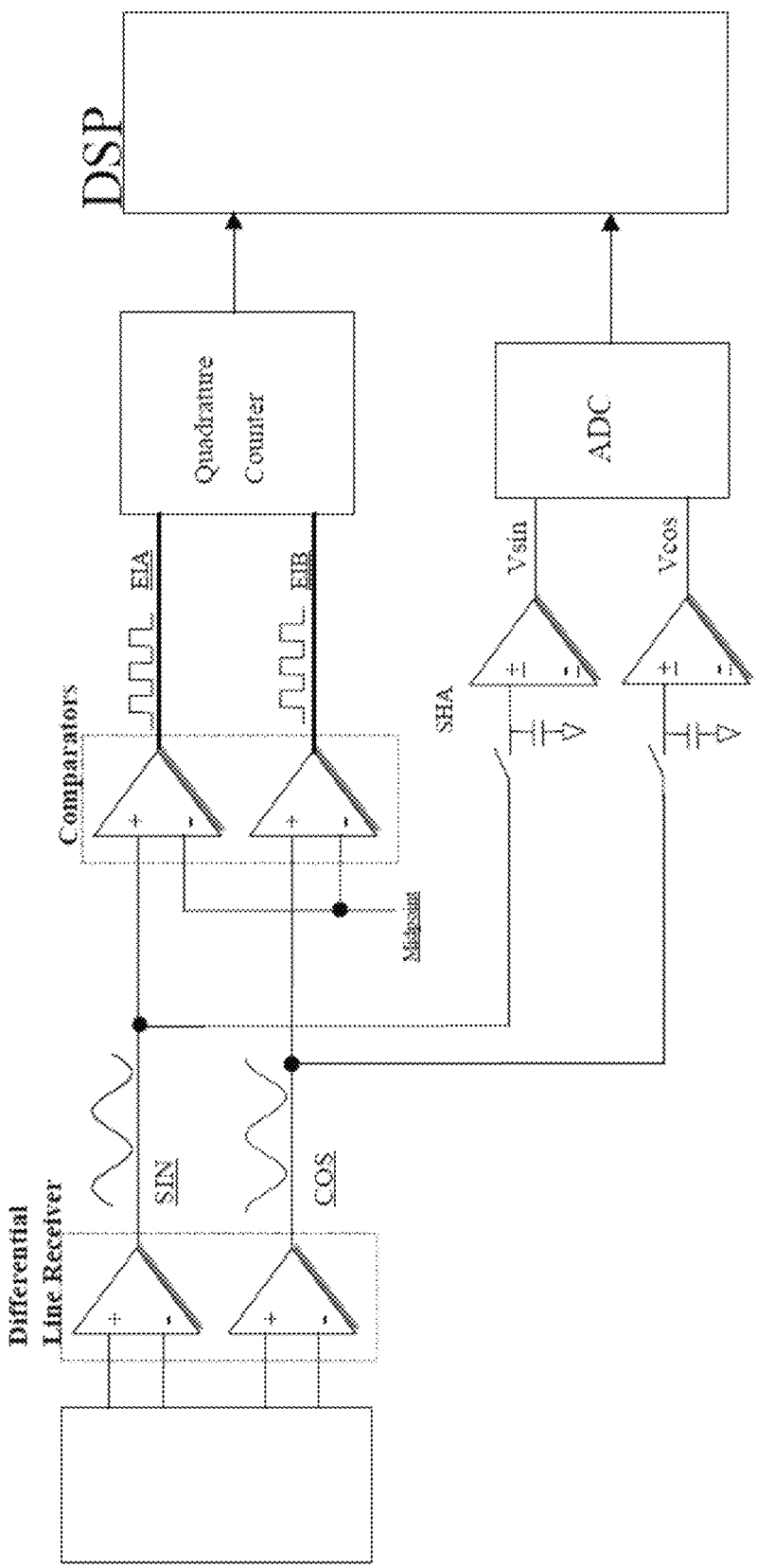
FIG. 5 includes FIGS. 5a and 5b and shows an example of a digital circuit for obtaining the instant phase or frequency of the light signal. The comparators in FIG. 5a are to get the zero crossing positions for period counting, as shown in the top and middle graphs in FIG. 5b. The ADC in FIG. 5a is to digitize the data and then the DSP is used to calculate the instant phase using $\theta=\tan^{-1}(\sin Y2/\cos Y1)$, as shown in the bottom graph in FIG. 5b.

Measuring optical frequencies of light can be performed by an optical spectrum analysis in various ways, including, for example, 1) using a spatially dispersive element, such as a diffractive grating, to spatially separate different optical frequency components, 2) using a tunable narrow band filter, such as a Fabry-Perot resonator or a tunable fiber Bragg grating, to sequentially tune the bandpass frequency to select different frequency components out of the input light, and 3) performing fast Fourier transfer (FFT) on the output of a Michaelson or Mach-Zehnder interferometer as the path difference between the two interfering arms is varying. The spectral resolution, spectral range, and measurement speed generally counter play with one another, and therefore it can be challenging to simultaneously achieve good performances of all three parameters in certain implementations of optical spectrum measurement devices. For example, the resolution and measurement range of a Fabry-Perot filter based spectrum analyzer are inversely proportional to each other. Implementations of such techniques for achieving good resolutions tend to compromise the measurement range which is set by the free spectral range (FSR) of a device.

For fast scanning tunable laser sources with a desired scanning range (e.g., 160 nm) and a suitable scanning repetition rate (e.g., tens of kHz), it is desirable to measure the wavelength as a function of time as the laser wavelength is scanned. Such time-dependent measurements of the laser wavelength by using above mentioned techniques can be difficult. The technology disclosed in this patent document can be implemented to provide improved and effective ways for preforming such measurements.

Various devices can be used for obtaining the optical spectrum information based on polarization analysis of a light signal passing through a differential group delay (DGD) element that causes a delay between the two orthogonal polarizations. Such devices can be designed to overcome the short comings of some other optical spectrum analyzers, and simultaneously achieve desired high spectral resolution, wide spectra range, and high speed. Examples of polarization-based optical spectrum analyzers include the examples in U.S. Pat. No. 8,345,238 by Yao for "Measuring optical spectral property of light based on polarization analysis". U.S. Pat. No. 10,895,477 to Yao et. al for "Sine-cosine optical frequency encoder devices based on optical polarization properties" by Yao (patent application Ser. No. 15/975,757 and U.S. Patent Publication No. US20180372517A1) provides examples of devices and techniques for detecting the optical frequency by analyzing optical power after the light passing through differential group delay (DGD) elements and polarizers. Those patents are incorporated by reference as part of the disclosure of this patent document.

This patent document includes examples of optical frequency detection devices suitable to be fabricated in photonics integrated circuits (PICs). The disclosed devices can be made without or minimize bulk optical components for a wide range of applications and to enable low cost construction and easy signal processing. In particular, the final frequency information can be deducted into a pair of sine and cosine functions, similar to that of a commonly used sine/cosine encoder for obtaining the angular or position information in motion control applications. Since sine/cosine encoders are widely used in the industry and the interpolation and applications of the signals are well known, such optical frequency detectors can be built by using the disclosed technology to achieve low cost and compact size for wide applications including, e.g., laser frequency measurement and control, FBG interrogation, and swept-frequency or chirped frequency sensor systems, as will be discussed below.

FIG. 1a illustrates a prior art example for a k-clock (or f-clock) generator based on Mach-Zehnder interferometer (MZI) commonly used in OCT, OFDR and coherent Lidar systems. The output photocurrents $I_1$ and $I_2$ from the interferometer's photodetectors (PD) can be expressed as $$I_1/I_{10}=1+\cos(2\pi f/FSR+\varphi_0), \quad (1a)$$

$$I_2/I_{20}=1-\cos(2\pi f/FSR+\varphi_0), \quad (1b)$$

where $I_{10}$ and $I_{20}$ are amplitudes of the detected photocurrent, which are proportional to the received optical power, the responsibilities of the PD's, and the access losses of the interferometer. The interferometer free spectral range FSR is defined as:

$$FSR=1/\tau=c/\Delta L, \quad (2)$$

where $\tau$ and $\Delta L$ are the delay between the two arms of the interferometer expressed in time and in optical path length, respectively. Subtracting Eq. (2) from Eq. (1) yields $$I_1/I_{10}-I_2/I_{20}=2\cos(2\pi f/FSR+\varphi_0) \quad (3)$$

FIG. 1b illustrates the relationship between measurement range and frequency measurement resolution. In principle, for the unambiguous detection of frequency increment, the detection range is limited to half of the free spectral range (FSR). However, a larger FSR results in a lower frequency slope and therefore worse measurement resolution. Conversely, a better frequency measurement resolution requires small FSR or a large delay imbalance between the two arms. For detecting a unidirectional optical frequency sweep, one may simply get zero-crossing frequencies which have equal frequency spacing for certain applications.

The k-clock generator can be used to generate trigger pulses with equal frequency spacing for data acquisition so that the data points obtained are labeled with equally-spaced frequency markers. As shown in FIG. 1b, such frequency markers can be generated with an imbalanced Mach-Zehnder interferometer (MZI) at the zero-crossing points if the tunable laser's frequency variation is unidirectional. Fast Fourier Transform (FFT) of the data can be used to obtain the correct distance information for the backscattered signals. One major issue with this approach is that a very large delay imbalance between two interfering arms is generally required, especially for applications in which very large measurement range is required, such as OFDR and coherent LiDAR. For example, for an OFDR with an intended measurement range of 1 km, a delay imbalance of 2 km may be required. Such a large delay is difficult to be integrated on a PIC chip. In addition, phase noise effect of the laser will be profound with such a long delay, causing k-clock inaccuracies. In particular, the effect of the laser phase noise may reverse the direction of laser frequency tuning locally, causing large errors in obtained distance information from the FFT.

FIG. 2 shows a $1^{st}$ embodiment of the disclosed technology in this patent document in which a $1^{st}$ and a $2^{nd}$ Mach-Zehnder interferometers are formed on a photonic chip by optical waveguides formed on the chip. The $1^{st}$ interferometer has a delay imbalance of $\Delta L$ between the two interfering optical arms, with the two outputs following Eqs (1) and (3). Two photodetectors PD1 and PD2 are provided to detector the two outputs.

The $2^{nd}$ interferometer in FIG. 2 has a delay imbalance of $\Delta L \pm \lambda_0/4$, where $\lambda_0$ is the center wavelength of the laser to be measured. This extra delay imbalance of $\pm\lambda_0/4$ introduces a phase of $\pm\pi/2$. Consequently, the two outputs from the $2^{nd}$ interferometer are $$I_3/I_{30}=1+\sin(2\pi f/FSR+\varphi_0), \quad (4a)$$

$$I_4/I_{40}=1-\sin(2\pi f/FSR+\varphi_0), \quad (4b)$$

$$I_3/I_{30}-I_4/I_{40}=2\sin(2\pi f/FSR+\varphi_0), \quad (4c)$$

where $I_3$ and $I_4$ are the photocurrent from two photodetectors PD 3 and PD4 of the 2nd interferometer, and $I_{30}$ and $I_{40}$ are the amplitudes of the detected photocurrents, which are proportional to the received optical power, the responsibilities of the PD's, and the access losses of the interferometer. The Eqs. (3) and (4c) can be used to obtain the following two equations $$\cos(\theta+\varphi_0)=(I_1/I_{10}-I_2/I_{20})/2 \quad (5a)$$

$$\sin(\theta+\varphi_0)=(I_3/I_{30}-I_4/I_{40})/2 \quad (5b)$$

where $\theta=2\pi f/FSR$ (5c)

By using the well-known sine/cosine interpolation algorithms, both the direction and the amplitude of $\theta$ variations can be obtained, even when $\theta$ changes over a large range of multiple of $2\pi$. In particular, $\theta$ can be obtained by $$\theta = \tan^{-1}\left(\frac{I_3/I_{30}-I_4/I_{40}}{I_1/I_{10}-I_2/I_{20}}\right)-\varphi_0 \quad (6)$$

when $\theta$ changes more than $2\pi$, the fringe counting can be implemented to unwrap the phase since the direction of $\theta$ can also be determined, as will be discussed later. The frequency variation can be readily obtained as:

$$\Delta f = \frac{1}{2\pi}\Delta\theta * FSR = \frac{1}{2\pi}\Delta\theta/\tau \quad (7)$$

Notably, this technique utilizes both the sine and cosine terms to achieve a very high resolution of frequency variations with an infinite measurement range. However, if only one of the sine and cosine terms is available, both the frequency resolution and the measurement range are limited. For example, for a LiDAR to have a measurement range of 300 m in air or an OFDR system to have a measurement range of 200 m in fiber, corresponding to a round the trip optical path length of 600 m, the delay imbalance of the Mach-Zehnder interferometer for generating the f-clock via zero-crossing should be at least 400 m in fiber (600 m in air). The corresponding frequency resolution $\delta f$ is $$\delta f = \frac{FSR}{2} = \frac{c}{2*600} = 250 \text{ kHz} \quad (8)$$

When both the sine detection and cosine detection are used, a minimum delay imbalance of only 0.92 mm in air is needed to achieve 250 kHz frequency resolution, assuming 16 bit digital resolution for processing the data. The estimation above can be obtained by enlarging the FSR in Eq. (8) by $2^{16}$ times because $2^{16}$ data points can be taken in half the period shown in FIG. 1b. In practice, a delay imbalance can be multiple of the minimum delay imbalance for better frequency resolution because the sine/cosine interpretation algorithm enabled by the design of FIG. 2 is capable of unwrapping the phase beyond $2\pi$. For example, if the interferometer is made with silicon waveguides with an effective index of 3, for a delay imbalance of 9 mm, the waveguide path length difference is only 3 mm, which can be easily fabricated in silicon photonics platform. Note that the larger the delay imbalance, the higher the data acquisition and processing rate is required, because the interferometer converts the optical frequency variation to optical power variation at a higher rate. In other words, the power variation rate from the interferometer in response to the frequency variation is proportional to the delay imbalance of the interferometer.

The OFD device in FIG. 2 can be constructed using waveguides and waveguide components on a substrate such as multi-mode interferometer (MMI) devices and optical couplers to provide desired optical coupling amongst the coupled optical waveguides for the interferometers. The entire device is an integrated on-chip system as part of a photonics integrated circuit (PIC) over a substrate and can be made compact in large scales at a low cost. The OFD device in FIG. 2 and other devices described in this patent document may be alternatively implemented using fiber segments and fiber couplers. In each of the two waveguide interferometers, at least one of the two optical arms of the interferometer is coupled to a tuning device that can change or tune the optical length of an optical arm. For example, optical heaters are coupled to the lower waveguide arm in each of the two interferometers in FIG. 2 to control the refractive index or/and length of the heated waveguide to control the relative phase delay between the two optical arms. Other devices other than heaters may be used to control the refractive index or/and length of either or both of the two waveguides to control the relative phase delay between the two optical arms, e.g., an electro-optic modulator. In the second interferometer, a phase shifter device is also coupled to the lower waveguide arm to provide the desired phase shift.

FIG. 3 shows an example of a polarization insensitive embodiment of the sine/cosine optical frequency detector (OFD). Because the waveguides used for making the frequency detector are of single mode waveguides, either TE mode or TM mode, for an input light having an arbitrary polarization, the configuration in FIG. 2 may be problematic. For example, if the waveguides in FIG. 2 only support TE mode, the TM mode components in the input light may be heavily attenuated, resulting in measurement inaccuracies. To overcome the problem, a polarization beam splitter is implemented in FIG. 3 to first split the input light into a TE waveguide in the upper branch of the optical circuit and a TM mode waveguide in the lower branch of the optical circuit. The light in the TE waveguide of the upper branch then enter into a sine/cosine OFD shown in FIG. 2. The light in the TM mode waveguide of the lower branch is then converted to TE mode via a TM-to-TE mode converter before entering an identical sine/cosine OFD as in the upper branch. This way, regardless the input polarization state, one can always have sufficient optical power in either the upper or lower branch OFD for obtaining the optical frequency information. In particular, by combining the signals in the upper and lower branches, the following OFD signals can be obtained:

$$\cos(\theta+\varphi_0)=[(I_1/I_{10}-I_2/I_{20})+(I_5/I_{50}-I_6/I_{60})]/4, \quad (9a)$$

$$\sin(\theta+\varphi_0)=[(I_3/I_{30}-I_4/I_{40})+(I_7/I_{70}-I_8/I_{80})]/4, \quad (9b)$$

Therefore, the OFD output in FIG. 3 is insensitive to the input polarization variations. If the input is of pure TE, $I_5=I_6=I_7=I_8=0$, the first terms in the right hand side of the Eqs. (9a) and (9b) contribute in the calculation. If the input is of pure TM, $I_1=I_2=I_3=I_4=0$, the second terms in the right hand side of the Eqs. (9a) and (9b) contribute in the calculation. When the input has both TE and TM components, both the first and second terms contribute in the calculation.

FIG. 4 shows one example of an analog circuit to implement an algorithm for calculating the instant phase or frequency of the light signal. Such an algorithm can also be implemented by perform the digital mathematical calculations shown in FIG. 4 to first obtain θ variation Δθ and then the optical frequency variation Δf using Eq. (7). Such an algorithm can also be implemented by perform the digital mathematical calculations shown in FIG. 5 to first obtain θ variation Δθ and then the optical frequency variation Δf using Eq. (7).

Figure 5B:
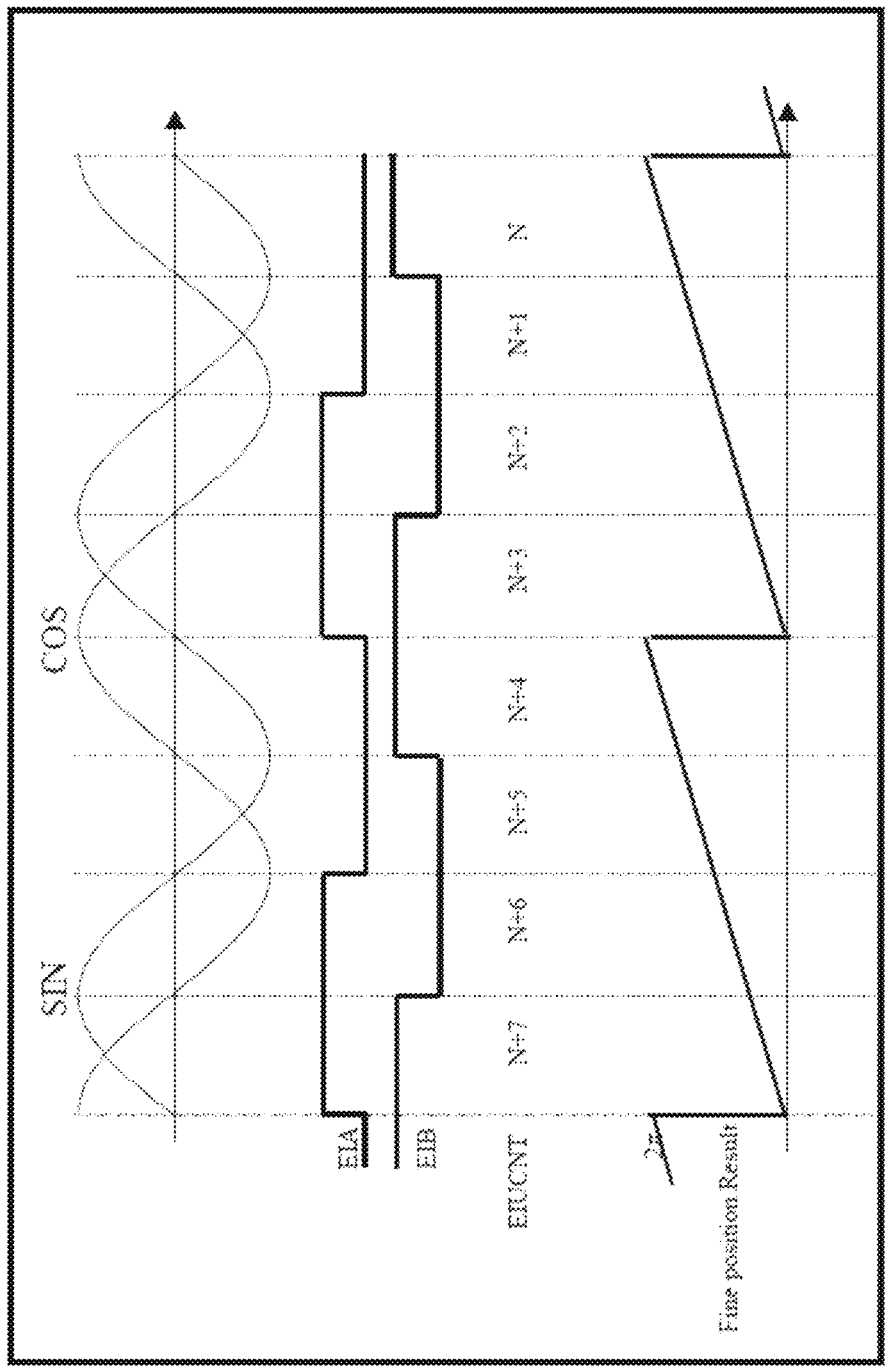

FIG. 5 shows a digital circuit for obtaining for obtaining the instant phase or frequency of the light signal. The comparators in FIG. 5a are to get the zero crossing positions for period counting, as shown in the top and middle graphs in FIG. 5b. The ADC in FIG. 5a is to $$\theta = \tan^{-1}\left(\frac{\sin Y2}{\cos Y1}\right),$$

digitize the data and then the DSP is used to calculate the instant phase using as shown in the bottom graph in FIG. 5b, where Y1 and Y2 are quantities at the right hand side of Eqs. (5a) and (5b), respectively, if the embodiment of FIG. 2 is used. Alternatively, Y1 and Y2 are quantities at the right hand side of Eqs. (9a) and (9b), respectively, if the embodiment of FIG. 3 is used.

FIG. 6 shows an example of another embodiment of a sine/cosine optical frequency detector (OFD) based on the technology disclosed in this patent document, which combines a Mach-Zehnder interferometer (MZI) of a large free spectral range (FSR) with the pair of interferometers of a small FSR to enable absolute optical frequency detection with a high resolution. Input light is polarized (e.g., in the TE polarization mode) and is split by an optical coupler, such as an input multimode interferometer (MMI) coupler into two polarized beams in the same polarization which are received by two waveguides. The upper branch goes to the OFD described in FIG. 2 and the lower branch goes to another MZI with a much smaller delay imbalance of δL or a much larger free spectral range (FSR).

FIG. 7 shows using the combination of an optical frequency detector (OFD) of a large FSR an OFD of a small FSR described in FIG. 6 for making an absolute frequency detector. The value of the large $FSR_2$ of the lower branch in FIG. 6 can be chosen such that in the frequency (or wavelength) range of interest, the detected optical power change is limited in the first quarter of the cosine function for the coarse absolute optical frequency measurement, as shown in the figure. Within this quarter period, there is a large amount of periods produced by the OFD of the small FSR. So long as the frequency resolution of the OFD with the large FSR is sufficiently fine to resolve a period of the OFD of the small FSR, the absolute frequency of the light source can be obtained unambiguously. For example, in some implementations, the large $FSR_2$ may be set to be on the order of thousands GHz while the small $FSR_1$ may be on the order of GHz.

In some implementations, the MZI with the large FSR in FIG. 6 can be replaced with a directional coupler having a strong wavelength dependence similar to that in FIG. 7, such as a directional coupler based coarse WDM with one port output 1550 nm signal and the other port output 1310 nm signal.

FIG. 8 illustrates such a sine/cosine OFD combining a pair of MZI's of a small free spectral range ($FSR_1=c/\Delta L$)

with a directional coupler to enable absolute optical frequency detection. Input light is polarized (e.g., in the TE polarization mode) and is split by an input MMI into two polarized beams in the same polarization that are directed into two waveguides. The upper branch goes to the OFD described in FIG. 2 with optical detectors PD1, PD2, PD3 and PD4 while the lower branch goes to a coarse WDM made with a directional coupler with a large free-spectral range ($FSR_2$). The directional coupler can be structured to include two optical waveguides that are placed adjacent to each other to cause optical evanescent coupling between the two optical waveguides to split the input light into two optical signals to be directed by two optical detectors PD5 and PD6. This directional coupler may be structured to exhibit a large $FSR_2$ and with two output ports for exporting optical output signals that are generated by splitting the input to the directional coupler.

The coupling ratios of the two output ports of the directional coupler can be used to measure the optical frequency f of the light based on the outputs of the two optical detectors PD5 and PD6, and the $FSR_2$:

$$\frac{I_5}{I_{50}} = 1 + \cos\left(\frac{2\pi}{FSR_2}f + \varphi_0\right) \tag{10a}$$

$$\frac{I_6}{I_{60}} = 1 - \cos\left(\frac{2\pi}{FSR_2}f + \varphi_0\right) \tag{10b}$$

$$f(t) = \left(\frac{FSR_2}{2\pi}\right)\mathrm{acos} - \frac{1}{2}\left[\frac{I_5}{I_{50}} - \frac{I_6}{I_{60}}\right] \tag{10c}$$

FIG. 9A illustrates an absolute sine/cosine OFD made with a different kind of interferometer including a 1×2 coupler (coupler 1) and a 2×3 MMI coupler with a small free spectral range ($FSR_1 = c/\Delta L$ which may be on the order of GHz in some implementations). This interferometer is used to replace the pair of MZI's in FIG. 2 and FIG. 6. The optical coupler 1 splits the polarized input light (e.g., in the TE polarization) into a first optical signal in an upper optical branch with an optical coupler 2 and a second optical signal in the lower optical branch. The interferometer in the upper branch is structured to generate three optical output interferometer signals in different phases relative to one another, e.g., with phases in 0 degree, 120 degrees and −120 degrees as shown in the example illustrated in FIG. 9A. The interferometer in the upper branch with a relatively small $FSR_1$ (e.g., on the order of GHz) can be implemented to use a 2×3 MMI coupler to combine the two different optical signals in two optical waveguides that are generated by the beam splitting at the optical coupler 2 to cause optical interference of those two optical signals and to produce the three optical output interferometer signals in different phases relative to one another. Optical detectors PD1, PD2 and PD3 are provided to detect the three optical output interferometer signals. This OFD can be combined with an OFD of a $FSR_2=c/\delta L$ in the lower branch produced by the optical coupler 1. The $FSR_2$ is much larger than $FSR_1$ to achieve absolute frequency detection, similar in principle to that of FIG. 7. For example, $FSR_2$ may be on the order of thousands GHz while the small $FSR_1$ may be on the order of GHz in some implementations. In the example shown in FIG. 9A, the signals from the three output ports of the 2×3 MMI coupler in different phase values can be expressed as:

$$I_1 = C + B\cos\theta_1(t) \tag{11a}$$

$$I_2 = C + B\cos[\theta_1(t) + 120°] \tag{11b}$$

$$I_3 = C + B\cos[\theta_1(t) - 120°] \tag{11c}$$

$$\theta_1(t) = \frac{2\pi}{FSR_1}f(t) \tag{11d}$$

FIG. 9B shows the phase relationship of the 3 outputs from the 2×3 MMI coupler in FIG. 9A, which are nominally 120° out of phase with each other. Based on the above relationships, the absolute value of the optical frequency f can be determined from the three signals:

$$\sin\theta_1(t) = (I_2 - I_1)(\sqrt{3}B) \tag{12a}$$

$$\cos\theta_1(t) = [2I_1 - (I_2 + I_3)]/(3B) \tag{12b}$$

$$\tan\theta_1(t) = \sqrt{3}(I_2 - I_1)/[2I_{21} - (I_2 + I_3)] \tag{12c}$$

$$f(t) = \frac{FSR_1}{2\pi}\mathrm{atan}\left\{\frac{\sqrt{3}(I_2 - I_1)}{[2I_1 - (I_2 + I_3)]}\right\} \tag{12d}$$

Phase unwrapping algorithms can be used to account phase changes beyond $2\pi$ in Eq. (12) to enable a large frequency measurement range. The incremental optical frequency f of the light source can therefore be obtained.

FIG. 9C shows an alternative configuration in which the OFD with the large FSR ($FSR_2$) in the lower optical branch at the output of optical coupler 1 can be replaced with a directional coupler based WDM to enable absolute optical frequency detection, similar to the configuration of FIG. 8.

FIG. 10 illustrates another sine/cosine OFD similar to that of FIG. 9A, except that the optical interferometer in the upper optical branch produced by the optical coupler 1 replaces 2×3 MMI coupler in FIG. 9A with a 2×4 MMI coupler to produce four optical interference signals with 4 different phase values. The upper optical branch interferometer is designed to produce two different output interference signals to first and second photodetectors PD1 and PD2 as cosine functions of the optical frequency and two other different interference signals to third and fourth photodetectors PD3 and PD4 as sine functions of the optical frequency:

$$I_1/I_{10} = 1 + \cos(2\pi f/FSR_1)$$

$$I_2/I_{20} = 1 - \cos(2\pi f/FSR_1)$$

$$I_3/I_{30} = 1 + \sin(2\pi f/FSR_1)$$

$$I_4/I_{40} = 1 - \sin(2\pi f/FSR_1)$$

In FIG. 10, a 1×2 coupler and the 2×4 MIMI coupler are used in the upper optical branch to form an interferometer of a small FSR ($FSR_1 = c/\Delta L$ on the order of GHz). This OFD can be combined with an OFD of a much larger FSR ($FSR_2 = c/\delta L$ on the order of thousands GHz) for absolute frequency detection, similar in principle to that of FIG. 7. Alternatively, the OFD with the large FSR can be replaced with a directional coupler based WDM to enable absolute optical frequency detection, similar to the configuration of FIG. 8 and FIG. 9. The four outputs from the 2×4 MMI coupler can be expressed as:

$$\frac{I_1}{I_{10}} = 1 + \cos\theta_1(t) \tag{13a}$$

-continued $$\frac{I_2}{I_{20}} = 1 - \cos\theta_1(t) \quad (13b)$$

$$\frac{I_3}{I_{30}} = 1 + \sin\theta_1(t) \quad (13c)$$

$$\frac{I_4}{I_{40}} = 1 - \sin\theta_1(t) \quad (13d)$$

$$f(t) = \frac{FSR_1}{2\pi}\operatorname{atan}\left[\left(\frac{I_3}{I_{30}} - \frac{I_3}{I_{30}}\right)\left(\frac{I_1}{I_{10}} - \frac{I_2}{I_{20}}\right)\right] \quad (13e)$$

The incremental optical frequency can be obtained from Eq. (13) with a high resolution and the absolute optical frequency can be obtained with the OFD with much smaller FSR.

FIG. 11 shows an example of a sine/cosine OFD system for minimizing polarization sensitivity of the sine/cosine OFD's described above. In general SiO$_2$ based photonics integrated circuits (PICs) are not polarization sensitive, while Si and SiN based PICs may be polarization sensitive. In FIG. 11, the incoming lightwave with an arbitrary polarization is split by a polarization splitter and rotator (PB SR) with the TM polarization rotated into the TE polarization so that the two output optical signals from the PBSR are in the same polarization, e.g., in the TE polarization as shown. Two identical OFD's described in FIGS. 8-10 are included to simultaneously detect the optical frequency in the two arms to eliminate the polarization sensitivity, similar to the case of FIG. 3.

FIG. 12 shows an example of a tunable laser integrated with any of the sine/cosine OFD disclosed above. The detected frequency b the sine/cosine OFD can be fed back to control the laser frequency to enable the device in FIG. 12 to function as an optical frequency synthesizer. As illustrated, a tunable laser is provided as the light source to generate a laser beam at a laser frequency and the laser beam from the tunable laser is directed to an optical coupler or splitter such as a multi-mode interferometer (MMI) device as shown to be split into a laser output beam and a laser frequency monitor beam. A first optical waveguide or fiber is provided and coupled to the optical coupler to receive and direct the laser output beam as the output beam and a second optical waveguide or fiber is provided and coupled to the optical coupler to receive and direct the laser frequency monitor beam to the sine/cosine OFD. A laser feedback control circuit is provided to use the measured laser frequency from the sine/cosine OFD to generate a feedback control signal for laser frequency control and to apply the laser feedback control signal to the tunable laser to tune the laser frequency in various ways. For example, this device may be used to achieve the following functionalities: 1) stabilize the laser output to any fixed frequency in the range; 2) generate a frequency ramp with a high linearity; 3) generate an arbitrary frequency variation waveform.

FIG. 13 illustrates an example of an optical coherence domain reflectometer (OFDR) integrated with a tunable laser, a pair of balanced photodetectors (PD5 and PD6 with an optional variable optical attenuator (VOA) in front of at least one photodetector), and a sine/cosine OFD based on the disclosure of this patent document. In such a system, the precisely known frequency increment is used for obtaining the accurate distance information of the object. An OFDR generally uses an optical interferometer (either of Mach-Zehnder or Michelson) with a large delay imbalance shown in FIG. 1, on the order of 100 meters, to generate f-clock representing the frequency increment for triggering the data acquisition. Such a large interferometer can be difficult to be integrated on a PIC chip. In addition, it may also suffer polarization fading caused by the polarization variations in the long fiber delay. Here the OFD detector can obtain the same frequency resolution with only few mm delay imbalance and therefore enable the direct integration, without the problem of polarization fading. Alternatively, the obtained frequency information may also be used to control the tunable laser for generating ultra-linear frequency modulation.

More specifically, the example OFDR system in FIG. 13 uses a tunable laser as a light source on a photonics integrated circuit (PIC) chip to produce an optical beam for optical sensing. A first beam splitter, which may be a MMI, is formed on the PIC chip and coupled to receive the optical beam from the tunable laser to split the optical beam into a first optical beam and a second optical beam. A second beam splitter, which may be another MIMI, is formed on the PIC chip and coupled to receive at least a portion of the first optical beam to split the received portion of the first optical beam into a probe beam and a reference beam. An optical port is formed as shown on the upper right corner of the PIC chip and is coupled to receive the probe beam from the second beam splitter to direct the probe beam into an optical fiber to cause light reflections or scattering inside the fiber at different locations to generate returned probe light which propagates back to the optical port and to the second beam splitter. The returned probe light carries information of temperature, strain, stress at these locations in the optical fiber and is used to extract such information. An optical reflector is provided either on or near the PIC chip to receive the reference beam from the second beam splitter and to reflect the reference beam back to the second beam splitter to interfere with the returned probe light from the fiber at the second beam splitter to produce an interference signal.

An optical detector module is coupled to receive the interference signal generated by the second optical beam splitter MIMI. In the example in FIG. 13, this optical detector module includes a photodetector PD5 coupled directly to receive a portion of the interference signal generated at the second MMI and another optical detector PD6 to also receive a portion of the interference signal generated at the second MMI. A beam coupler is formed between the first and second MMI beam splitters so that a portion of the interference signal generated at the second MMI is split into the PD6.

Downstream from the first optical beam splitter MIMI, an optical frequency detection device is provided on the PIC chip and is located to receive the second optical beam from the first optical beam splitter MMI to detect and measure a frequency variation in the second optical beam caused by a frequency variation in light of the optical beam produced by the tunable laser. This optical frequency detection device can be implemented in various configurations as disclosed in this patent document. As illustrated, the digital circuit has a signal input port that is coupled to the photodetectors Pd5 and PD6 and another signal input port that is coupled to receive the information on the measured laser frequency of the laser. In operation, the measured frequency variation in the second optical beam by the optical frequency detection device is used to compute a fast Fourier transform of the interference signal to obtain information contained in the returned probe light on temperature, strain, or stress as a function of a location in the fiber. In this design, the measured frequency variation in the second optical beam is used to generate f-clock representing the frequency increment for triggering the data acquisition by the digital circuit based on the detector outputs from PD5 and PD6. In addition, an electronic control module can be used to, based on the measured frequency variation in the second optical beam, to provide a feedback control to control or adjust the frequency of the tunable laser.

FIG. 14 illustrates an example of a chirped LiDAR integrated with a tunable laser, a pair of balanced photodetectors (PD5 and PD6 with an optional variable optical attenuator (VOA) in front of at least one photodetector), and a sine/cosine OFD based on the disclosure of this patent document. The tunable laser may be implemented by a frequency modulated continuous wave (FMCW) laser under control by a feedback control signal from the control electronics of the chirped lidar. In such a system, the precisely known frequency increment is essential for obtaining the accurate distance information of the object. A Lidar generally uses an optical interferometer (either of Mach-Zehnder or Michelson) with a large delay imbalance shown in FIG. 1, on the order of 100 meters, to generate f-clock representing the frequency increment for triggering the data acquisition. Such a large interferometer is impossible to be integrated on a PIC chip. In addition, it may also suffer polarization fading caused by the polarization variations in the long fiber delay. Here the OFD detector can obtain the same frequency resolution with only few mm delay imbalance and therefore enable the direct integration, without the problem of polarization fading. Alternatively, the obtained frequency information may also be used to control the tunable laser for generating ultra-linear frequency modulation.

FIG. 15 shows an example of a frequency domain optical coherent tomography (OCT) device integrated with a tunable laser, a pair of balanced photodetectors, and a sine/cosine OFD based on the disclosure of this patent document. Such an OCT device can be used for medical imaging and various other sensing applications. In such a system, the precisely known frequency increment is essential for obtaining the accurate distance information of the object. An OCT system generally uses an optical interferometer (either of Mach-Zehnder or Michelson) with a relatively large delay imbalance, to generate f-clock representing the frequency increment for triggering the data acquisition. Such a large interferometer is difficult to be integrated on a PIC chip. Here the OFD detector can obtain the same frequency resolution with only sub-millimeter delay imbalance and therefore enable the direct integration. Alternatively, the obtained frequency information may also be used to control the tunable laser for generating ultra-linear frequency modulation.

FIG. 16 shows an example of an on-chip fiber Bragg grating (FBG) interrogator by integrating a broad band light source, a wavelength division multiplexer (WDM), a N×1 switch, and a sine/cosine OFD based on the disclosure of this patent document. A series of fiber Bragg grating (FBG) segments are coupled to or formed within, a sensing fiber at different locations and at different resonant wavelengths. The sensing fiber with FBG sensors can be deployed into various devices, systems, or structures for obtaining useful measurements by detecting returned optical signals from the FBGs and processing the detected signals. The sensing fiber can be packaged in a strong, rugged material or package to withstand harsh environmental conditions and the presence multiple FBG sensors allow simultaneous measurements at different locations. The broadband light source is injected into the fiber with N FBG's reflect different wavelengths towards the WDM for separating them into N waveguides. The N×1 switch is used to switch the light of each WDM channel to the OFD. The wavelength shift of the reflected light caused by the temperature or strain in the FBG can be precisely detected by the OFD. The WDM can be made with arrayed waveguide grating (AWG). Note that the spacing between the two adjacent wavelength channels should be larger than the wavelength shift of each FBG caused by physical parameters to be sensed, such as the temperature, the strain, or the vibration.

FIG. 17 shows an example of an on-chip FBG interrogator by integrating a broad band light source, a wavelength division multiplexer (WDM) with N wavelength channels, and N sine/cosine OFDs based on the disclosure of this patent document. The broadband light source is injected into the fiber with N FBG's reflect different wavelengths towards the WDM for separating them into N waveguides. Each waveguide is connected to an OFD. The wavelength shift of the reflected light caused by the temperature or strain in each FBG can be precisely detected by the corresponding OFD. The WDM can be made with arrayed waveguide grating (AWG). The embodiment of FIG. 17 can simultaneously detect N FBG channels, while the embodiment of FIG. 16 can sequentially detect N FBG channels. Note that the spacing between the two adjacent wavelength channels should be larger than the wavelength shift of each FBG caused by physical parameters to be sensed, such as the temperature, the strain, or the vibration.

In applications, the disclosed OFD devices in this patent document can be used to perform distributed sensing in an optical fiber.

FIG. 18A discloses an example of a first PIC interrogator chip design for interferometric distributed sensing based on an OFD disclosed above and a 90° hybrid coherent receiver to implement two 90-degree hybrid coherent receivers shown in two dashed boxes to form a balanced detection amplification scheme. This chip example includes a laser input port to receive input laser light and an output port that is coupled to direct probe light either into an optical fiber (for OFDR applications) or on to objects in free-space (for OCT or LiDar applications) to be sensed and to collect returned probe light from the fiber or the objects. Therefore, the optical output port shown in FIG. 18A serves as an optical input port for the PIC interrogator chip to receive the returned probe light. For the case of the probe light into the optical fiber, the Rayleigh back scattering which contains the local information of temperature, strain, or stress in the fiber, along with the location information, returns to the PIC interrogator chip to be analyzed. For the case of the probe light onto the objects in free space, the reflected or backscattered light from the objects containing the location, strength of reflection, speed, and retardation information of the objects collected and directed to the PIC interrogator to be analyzed. A small portion of the laser input (e.g., 5-10%) is first split by optical coupler C1 into a sine/cosine optical frequency detector to detect its instant frequency to be used as a k-clock or frequency clock for the system. The remaining portion of the laser input is further split out a small portion (e.g., 5-10%) by a second optical coupler C2 as a reference via a third optical coupler C3 to enter a first 90° hybrid coherent receiver (with photo detectors PD1, PD2, PD3 and PD4) and a second 90° hybrid coherent receiver (with photo detectors PD5, PD6, PD7 and PD8) after going through an optical delay between optical couplers C2 and C3. This delay is useful for OCT operation to balance out the optical path length of the returned light (reflected or backscattered) from the sample only if the coherence length of the laser light is shorter than the optical path length of the returned light as for the case of OCT operation. The light from the optical coupler C2 is split by the optical coupler C2 into two waveguides as two optical reference signals or optical local oscillator signals LO1 and LO2 to the first and second 90° hybrid coherent receivers, respectively. Downstream from the second optical coupler C2 in the main optical path between the laser input port and the optical output port of the PIC interrogator chip, the remainder of the input laser light is used as the probe laser light for sensing is the output at the optical output port which also serves as an optical input port for receiving the returned probe light.

As shown in FIG. 18A, an optional semiconductor optical amplifier (SOA) may be placed in the main optical path between the second optical coupler C2 and the output port the PIC interrogator chip to boost or amplify the optical power of the probe light power exiting from the chip. The output probe light is directed to a sample for optical sensing. In operation, the returned light from the sample illuminated by the output probe light may contain light in an arbitrary state of polarization in general and a portion of the returned light from the sample (e.g., 50%) is split out by an optical coupler C4 for optical detection. This portion of the returned light split out by the optical coupler C4 is directed to enter a polarization beam splitter and rotator (PBSR) which separates the returned light from the optical coupler C4 into TE and TM optical beams and then rotates the polarization of one of the beams so the two beams are in the same polarization, e.g., rotating the polarization of the TM optical beam to change it into a TE optical beam. As illustrated, an optional variable optical attenuator (VOA) may be placed in the output of the PBSR to adjust the signal level. The two outputs in the same polarization (e.g., TE) from the PBSR are then directed into the first and second 90° hybrid coherent receivers, respectively and are made to interfere with the reference light from optical couplers C2 and C3 to produce two pairs of I-Q interference signals $V_1$, $V_2$, $V_3$, and $V_4$. The optical coupler C3 is placed to receive the reference light split out by the second optical coupler C2 and splits the received reference light into two reference light beams for the two 90-degree hybrid coherent receivers shown in two dashed boxes to form a balanced detection amplification scheme to produce the four outputs $V_1$, $V_2$, $V_3$, and $V_4$. The phase information can be obtained by using $\sin \varphi(t)=(V_1+V_3)/(V_{10}+V_{30})$ and $\cos \varphi(t)=(V_2+V_4)/(V_{20}+V_{40})$.

FIG. 18B shows that the PBSR section in FIG. 18A can be replaced with a 2-dimensional (2D) vertical grating coupler (VGC) for achieving polarization splitting. Light from coupler C2 enters coupler C5 and propagates in a waveguide supporting TE mode towards the 2D VGC, which then either couples into an optical fiber or exits into free space as a sensing light beam. The light beam reflected by the sample or objects to be sensed contains both TE and TM polarization components and then re-enter the 2D VGC. The 2D VGC separates the TE and TM components of the reflected beam into a $1^{st}$ waveguide supporting TE mode and a second waveguide supporting the TM modes. The light beam in the $1^{st}$ waveguide produces a $1^{st}$ reflected beam. A TM to TE mode converter converts the TM mode to a TE mode in a TE waveguide to produce a $2^{nd}$ reflected beam. The first reflected beam enters the $1^{st}$ 90° hybrid to interfere with the reference light from C3 and the $2^{nd}$ reflected beam enters the $2^{nd}$ 90° hybrid to interfere with another reference light from C3 to produce two pairs of I-Q interference signals. The balanced detection amplification scheme produces four outputs $V_1$, $V_2$, $V_3$, and $V_4$. The phase information can be obtained by using $\sin \varphi(t)=(V_1+V_3)/(V_{10}+V_{30})$ and $\cos \varphi(t)=(V_2+V_4)/(V_{20}+V_{40})$.

FIG. 19 discloses an example of a second PIC interrogator chip design for interferometric distributed sensing based on an OFD and a 2×4 MMI coupler. The operation of the device is almost the same as that of FIG. 18, except that here a coherent receiver based on a 2×4 MMI coupler is used to replace the 90° hybrid coherent receiver in FIG. 18. The two outputs of the returned light from the PBSR are made to interfere with the reference light from C3 to produce two pairs of to produce two pairs of I-Q interference signals. The balanced detection amplification scheme produces four outputs $V_1$, $V_2$, $V_3$, and $V_4$. The phase can be obtained by using $\sin \varphi(t)=(V_1+V_3)/(V_{10}+V_{30})$ and $\cos \varphi(t)=(V_2+V_4)/(V_{20}+V_{40})$. Similar to FIG. 18B, the PBSR section can be replaced with a 2D vertical grating coupler to separate the two orthogonal polarization components.

FIG. 20 discloses an example of a third PIC interrogator chip design for interferometric distributed sensing based on an OFD and a 2×3 MMI coupler. The operation of the device is almost the same as that of FIG. 18, except that here a coherent receiver based on a 2×3 MMI coupler is used to replace the 90° hybrid coherent receiver in FIG. 18. The two outputs of the returned light from the PBSR are made to interfere with the reference light from C2 to produce three of interference signals for obtaining the returned phase information $\varphi(t)$, which has the same expression of Eq. (12), with $\varphi(t)$ replacing $\theta_1(t)$. Similar to FIG. 18B, the PBSR section can be replaced with a 2D vertical grating coupler to separate the two orthogonal polarization components.

FIG. 21 shows an example for how a PIC interrogator chip can be used for different distributed sensing applications, including OCT, OFDR, FMCW LiDAR and Distributed Acoustic Sensing (DAS). As shown in the left and right hand sides of the PIC chip, for different applications, the lasers at the input of the chip and the optics at the output of the chip are different while using the same PIC interrogator chip. The box on the left shows the requirements of the laser parameters for different applications, while the drawings on the right showing the optics for OFDR, OCT, and LiDAR applications. Because the same PIC interrogator chip can be used for three different sensing applications, the development cost can be shared and the market size for the chip can be significantly increased.

In operation, the phase information of the returned signal can be demodulated as a function of the optical frequency in the returned signal while the laser frequency is tuned with time. The frequency increment can be precisely detected with the optical frequency detector. Taking the FFT of the phase of the returned signal, the reflection vs. distance information can be obtained and therefore can be used for achieving distributed sensing. The algorithms for obtaining the required sensing information, such as temperature, strain, birefringence, scattering strength, speed and direction of moving objects, etc. are the same as those of OCT, OFDR, and LiDAR.

FIGS. 22 and 23 show two specific examples of a coherent interrogator chip with polarization diversity detection for distributed optical sensing applications, including optical frequency domain reflectometer (OFDR), optical coherence tomography (OCT) and coherent LiDAR based on the PIC interrogator chip design in FIG. 21. FIGS. 22 and 23 are not part of the parent application under U.S. patent application Ser. No. 17/515,050.

FIG. 22 illustrates one example of an embodiment of a coherent interrogator chip with polarization diversity detection for distributed optical sensing applications, including optical frequency domain reflectometer (OFDR), optical coherence tomography (OCT) and coherent Lidar. Light input is first split by coupler C1 into two paths, with one of them going into the optical frequency detector for measuring the optical frequency and the other going through a downstream optical coupler C2 to be further split into two beams: one as the probe light going out of the chip via the output port for sensing and another one to an on-chip optical coupler C4 as an optical reference signal. The probe light going out of the chip via the output port for sensing may be the majority of the beam after the splitting at coupler C2 (e.g., 95%) and continues to go through another optical coupler C3 before sending out as the sensing beam. The returned sensing signal received at the output port is split by the optical coupler C3 before going through the PBSR so that the two orthogonal polarizations are split into two beams of the same polarization (e.g., TE polarization as illustrated) along two optical paths after the PB SR. Those two beams of the same polarization are directed to two optical couplers C5 and C6 for optical detection. Referring back to the optical coupler C2, the weaker light split by the optical coupler C2 (e.g., 5% of the input light to C2) is directed to an on-chip optical coupler C4 as an optical reference signal and is first split by optical coupler C4 as two optical reference signals in two optical paths to two optical couplers C5 and C6 to interfere with the returned sensing signals via couplers C5 and C6 to produce two sets of beat signals containing the information of the locations and strengths of the targets being sensed. At each optical coupler C5 or C6, two output interference signals are directed to two photodetectors, respectively: photodetectors PD3 and PD4 are used to respectively receive and detect two interference signals produced at the optical coupler C5 and photodetectors PD5 and PD6 are used to respectively receive and detect two interference signals produced at the optical coupler C6.

FIG. 23 illustrates another example of an embodiment of a coherent interrogator chip with polarization diversity detection for distributed optical sensing applications, including optical frequency domain reflectometer (OFDR), optical coherence tomography (OCT) and coherent Lidar, in which a free-space micro-circulator is used for reducing the optical insertion loss of the system. Different from the input/output design for the coherent interrogator chip in FIG. 22 which uses the same optical port on the chip for sending out probe light and for receiving the returned probe light, the coherent interrogator chip in FIG. 23 has two separate optical ports on the chip: (1) a first optical port as the designated probe output port for sending out probe light from the chip to a sensing target or region and (2) a second t optical port as the designated probe input port for receiving the returned probe light from the target or region so that the returned probe light will be directed only to the designated probe input port and will not be directed to the designated probe output port. To achieve this, an optical circulator is coupled to the two designated optical ports on the chip and has 3 ports marked as Port 1, Port 2 and Port 3, respectively, to circulate light from Port 1 to Port 2, from Port 2 to Port 3, and from Port 3 to Port 1. With this 3-port optical circulator, the probe light output by the probe output port is directed to Port 1 and then to Port 2 to the target and the returned probe light from the target received by Port 2 is directed to Port 3 which is received by the probe input port. This design eliminates the need for the on-chip optical coupler C3 and thus the optical loss by the coupler C3 in detecting the returned probe light in the design in FIG. 22 by providing a waveguide to link the PBSR to the probe input port to improve the light collection efficiency for detecting the returned probe light.

The technical features disclosed in this patent document may be implemented in various ways to construct various devices. Some examples are provided below.

Item 1. a device for measuring an optical frequency of light, comprising:
a substrate;
first optical waveguides integrated to and supported by the substrate and coupled to form a first Mach-Zehnder interferometer having two interfering optical arms and an input optical port to receive a first portion of input light at an input optical wavelength that is split into the two interfering optical arms and an output optical port to receive and combine light from the two interfering optical arms to produce two first optical output interferometer signals;|
two first photodetectors supported by the substrate and located to receive the two first optical output interferometer signals, respectively, wherein the two first photodetectors produce first and second detector signals, respectively, and each of the first and second detector signals varies as a sine function of an optical frequency corresponding to the input optical wavelength;
second optical waveguides integrated to and supported by the substrate and coupled to form a second Mach-Zehnder interferometer having two interfering optical arms and an input optical port to receive a second portion of the input light which is split into the two interfering optical arms, and an output optical port to receive and combine light from the two interfering optical arms to produce two second output interferometer signals, wherein the second Mach-Zehnder interferometer is structured to have a phase difference between the two interfering arms different by one quarter of the input optical wavelength from a phase difference between the two interfering arms of the first Mach-Zehnder interferometer;
two second photodetectors supported by the substrate and located to receive the two second optical output interferometer signals, respectively, wherein the two second photodetectors produce third and fourth detector signals, respectively, and wherein each of the third and fourth detector signals varies as a cosine function of the optical frequency corresponding to the input optical wavelength; and
a processing module coupled to receive the first, second, third and fourth detector signals and operable to process the first, second, third and fourth detector signals to determine a change in the optical frequency of the input light.

Item 2. The device as in Item 1, wherein each of the first and second Mach-Zehnder interferometer includes at least one phase control device coupled to one of the two interfering arms to control the phase difference between the two interfering arms.

Item 3. The device as in Item 1, wherein the at least one phase control device includes a heater to control the phase difference between the two interfering arms.

Item 4. The device as in Item 1, wherein the substrate includes silicon or a silica.

Item 5. The device as in Item 1, comprising:
a polarization beam splitter supported by the substrate and located in an optical path of the input light to split the input light into a first input beam of the input light in a first optical polarization and a second input beam of the input light in a second optical polarization orthogonal to the first optical polarization;
a first optical coupler supported by the substrate and located to receive the first input beam and to split the first input beam into the first and second portions of the input light that are received, respectively, by the first and second Mach-Zehnder interferometers in the first optical polarization;

a second optical coupler supported by the substrate and located to receive the second input beam and to split the second input beam into third and fourth portions of the input light in the second optical polarization;

third optical waveguides integrated to and supported by the substrate and coupled to form a third Mach-Zehnder interferometer having two interfering optical arms and an input optical port to receive the third portion of input light which is split into the two interfering optical arms and an output optical port to receive and combine light from the two interfering optical arms to produce two third optical output interferometer signals;| two third photodetectors supported by the substrate and located to receive the two third optical output interferometer signals, respectively, wherein the two third photodetectors produce fifth and sixth detector signals, respectively, and each of the fifth and sixth detector signals varies as a sine function of the optical frequency;

fourth optical waveguides integrated to and supported by the substrate and coupled to form a fourth Mach-Zehnder interferometer having two interfering optical arms and an input optical port to receive the fourth portion of the input light which is split into the two interfering optical arms, and an output optical port to receive and combine light from the two interfering optical arms to produce two fourth output interferometer signals, wherein the fourth Mach-Zehnder interferometer is structured to have a phase difference between the two interfering arms different by one quarter of the input optical wavelength from a phase difference between the two interfering arms of the third Mach-Zehnder interferometer;

two fourth photodetectors supported by the substrate and located to receive the two fourth optical output interferometer signals, respectively, wherein the two fourth photodetectors produce seventh and eighth detector signals, respectively, and wherein each of the seventh and eighth detector signals varies as a cosine function of the optical frequency; and wherein the processing module is further coupled to receive the fifth, sixth, seventh and eighth detector signals and operable to process the fifth, sixth, seventh and eighth detector signals to determine a change in the optical frequency of the input light.

Item 6. The device as in Item 1, comprising:

a beam splitter supported by the substrate and located in an optical path of the input light to split the input light into a first input beam of the input light and a second input beam of the input light;

an optical coupler supported by the substrate and located to receive the first input beam and to split the first input beam into the first and second portions of the input light that are received, respectively, by the first and second Mach-Zehnder interferometers;

third optical waveguides integrated to and supported by the substrate and coupled to form a third Mach-Zehnder interferometer having two interfering optical arms and an input optical port to receive the second input beam which is split into the two interfering optical arms and an output optical port to receive and combine light from the two interfering optical arms to produce two third optical output interferometer signals, wherein the third Mach-Zehnder interferometer is structured to have a phase difference between the two interfering arms that is smaller than the phase difference in the two interfering arms of the first and second Mach-Zehnder interferometer;| and two third photodetectors supported by the substrate and located to receive the two third optical output interferometer signals, respectively, wherein the two third photodetectors produce fifth and sixth detector signals, respectively.

Item 7. The device as in Item 1, comprising:

a beam splitter supported by the substrate and located in an optical path of the input light to split the input light into a first input beam of the input light and a second input beam of the input light;

a first optical coupler supported by the substrate and located to receive the first input beam and to split the first input beam into the first and second portions of the input light that are received, respectively, by the first and second Mach-Zehnder interferometers;

a second optical coupler supported by the substrate and structured to include two third optical waveguides that are placed adjacent to each other to cause optical evanescent coupling between the two third optical waveguides as a directional optical coupler located to receive the second input beam and to split the second input beam into third and fourth optical signals;

two third photodetectors supported by the substrate and coupled to receive the third and fourth signals output by the second optical coupler, respectively, wherein the two third photodetectors produce fifth and sixth detector signals, respectively; and wherein the processing module is further coupled to receive the fifth and sixth detector signals and operable to process the fifth and sixth detector signals to determine an absolute frequency value of the optical frequency of the input light.

Item 8. A device for measuring an optical frequency of light, comprising:

a substrate;

a beam splitter supported by the substrate and located in an optical path of the input light to split the input light into a first input beam of the input light and a second input beam of the input light;

a first optical coupler supported by the substrate and located to receive the first input beam and to split the first input beam into the first and second portions of the input light;

first optical waveguides integrated to and supported by the substrate and coupled to form a first Mach-Zehnder interferometer having two interfering optical arms and an input optical port to receive the first portion of input light and split the received first portion into different beams in the two interfering optical arms and an output optical port to receive and combine light from the two interfering optical arms to produce three or more first optical output interferometer signals in different phases relative to one another;| three or more first photodetectors supported by the substrate and located to receive the three or more first optical output interferometer signals, respectively, wherein the first photodetectors produce three or more first detector signals, respectively, and each of the first detector signals varies as a sine or cosine function of an optical frequency corresponding to the input optical wavelength;

second optical waveguides integrated to and supported by the substrate and coupled to form a waveguide device to receive the second input beam from the beam splitter and to produce two output signals of complementary wavelength responses;

two second photodetectors supported by the substrate and located to receive the two output signals of the waveguide device, respectively, wherein the two second photodetectors produce two second detector signals, respectively, and wherein each of the second detector signals varies as a cosine function of the optical frequency corresponding to the input optical wavelength; and a processing module coupled to receive the first and second detector signals and operable to process the first and second detector signals to determine an absolute value of, and a change in, the optical frequency of the input light.

Item 9. The device as in Item 8, wherein the waveguide device is structured as a Mach-Zehnder interferometer having a larger free spectral range than a free spectral range of the first Mach-Zehnder interferometer.

Item 10. The device as in Item 8, wherein the waveguide device is structured as a directional coupler with a coupling ratio a slow function of optical wavelength having a larger free spectral range than a free spectral range of the first Mach-Zehnder interferometer.

Item 11. The device as in Item 8, wherein the output optical port is a 2×3 multimode interference coupler with 3 output ports to produce three interference signals.

Item 12. The device as in Item 8, wherein the output optical port is a 2×4 multimode interference coupler with 4 output ports to produce three interference signals.

Item 13. A device for measuring an optical frequency of light, comprising
a polarization beam splitter and rotator supported by the substrate and located in an optical path of the input light to split the input light into a first input beam of the input light in a first optical polarization in a TE mode and a second input beam of the input light in a second optical polarization orthogonal to the first optical polarization in a TM mode, and then rotate the second polarization of the TM mode into the first polarization in the TE mode;
a first optical frequency sensing device coupled to receive the first input beam from the polarization beam splitter to measure an absolute value of, and a change in, the optical frequency of the first input light; and
a second optical frequency sensing device coupled to receive the second input beam from the polarization beam splitter to measure an absolute value of, and a change in, the optical frequency of the second input light,
wherein each of the first and second optical frequency sensing devices is structured as a device for measuring an optical frequency of light in Item 8.

Item 14. A device for light detection and ranging (LiDAR) on a substrate, comprising:
a light source to produce an optical beam;
a beam splitter to split the optical beam into a first optical beam and a second optical beam;
a beam scanning device located in an optical path of the first optical beam to direct and scan the first optical beam to a surrounding area for LiDAR sensing and to receive returned light from objects in the surrounding area illuminated by the first optical beam;
an optical detector module coupled to receive the returned beam from the optical scanning device and to produce a detector output signal for LiDAR sensing; and an optical frequency detection device located to receive the second optical beam to detect and measure a frequency variation in the second optical beam caused by a frequency variation of the optical beam produced by the light source,
wherein the optical frequency detection device is structured and formed on a substrate according to one of Items 1 through 13; and
wherein the measured frequency variation in the second optical beam is used to compute the fast Fourier transform of the detector output signal to obtain information of locations and speeds of the objects illuminated by the first optical beam.

Item 15. The device as in Item 14, further comprising:
an electronic control module coupled to the light source and operable to adjust an optical frequency of the optical beam produced by the light source in response to the frequency variation detected by the optical frequency detection device.

Item 16. A device for optical coherent tomography (OCT) on a substrate, comprising: a light source to produce an optical beam;
a beam splitter to split the optical beam into a first optical beam and a second optical beam;
an OCT module coupled to receive the first optical beam from the optical beam splitter to split the first optical beam into an OCT reference beam and an OCT sampling beam for sampling a target, and configured to cause optical interference between the OCT reference beam and a returned OCT sampling beam from the target for OCT detection; and
an optical frequency detection device located to receive the second optical beam to detect and measure a frequency variation in the second optical beam caused by a frequency variation by the light source,
wherein the optical frequency detection device is structured and formed on a substrate according to one of Items 1 through 13.

Item 17. The device as in Item 16, further comprising:
an electronic control module coupled to the light source and operable to adjust an optical frequency of the optical beam produced by the light source in response to the frequency variation detected by the optical frequency detection device.

Item 18. A fiber sensing system, comprising:
a light source to produce an optical beam;
a sensing fiber coupled to receive the optical beam and structured to include N different fiber Bragg gratings at different locations in series in the sensing fiber for sensing, wherein the N different fiber Bragg gratings are structured to have different Bragg resonance wavelengths;
a wavelength division demultiplexing device coupled to receive returned light from the N different fiber Bragg gratings in the sensing fiber and operable to separate the received returned light into N different optical beams at the different Bragg resonance wavelengths, respectively;
a N×1 optical switch coupled with N input ports to receive light from the wavelength division demultiplexing device with N output ports and operable to switch or select one of the N different optical beams at the different Bragg resonance wavelengths as an optical switch output, one at a time;

an optical frequency detection device located to receive the optical switch output from the optical switch and operable to detect and measure a frequency variation in the received light, wherein the optical frequency detection device is structured according to one of Items 1 through 13.

Item 19. The device as in Item 18, further comprising:

an optical circulator that directs the optical beam from the light source to the sending fiber and to direct light from the sensing fiber to the wavelength division demultiplexing device.

Item 20. A fiber sensing system, comprising:

a light source to produce an optical beam;

a sensing fiber coupled to receive the optical beam and structured to include N different fiber Bragg gratings at different locations in series in the sensing fiber for sensing, wherein the N different fiber Bragg gratings are structured to have different Bragg resonance wavelengths;

a wavelength division demultiplexing device coupled to receive returned light from the N different fiber Bragg gratings in the sensing fiber and operable to separate the received returned light into N different output optical beams at the different Bragg resonance wavelengths, respectively;

N optical frequency detection devices each located to receive one of the N output optical beams from the wavelength division demultiplexing device and operable to detect and measure a frequency variation in the received light from one of N Bragg gratings, wherein each of the optical frequency detection devices is structured as an integrated device on a substrate according to one of Items 1 through 13.

Item 21. The device as in Item 20, further comprising:

an optical circulator that directs the optical beam from the light source to the sending fiber and to direct light from the sensing fiber to the wavelength division demultiplexing device.

Item 22. A device for optical frequency domain reflectometry (OFDR), comprising:

a substrate;

a light source formed on the substrate to produce an optical beam;

a first beam splitter formed on the substrate and coupled to receive the optical beam to split the optical beam into a first optical beam and a second optical beam;

a second beam splitter formed on the substrate and coupled to receive at least a portion of the first optical beam to split the received portion of the first optical beam into a probe beam and a reference beam;

an optical port coupled to receive the probe beam from the second beam splitter to direct the probe beam into an optical fiber to cause light reflections or scattering inside the fiber at different locations to generate returned probe light which propagates back to the optical port and to the second beam splitter, wherein the returned light carries information of temperature, strain, stress at these locations in the optical fiber;

an optical reflector located on or near the substrate to receive the reference beam from the second beam splitter and to reflect the reference beam back to the second beam splitter to interfere with the returned probe light from the fiber at the second beam splitter to produce an interference signal;

an optical detector module supported by the substrate and coupled to receive the interference signal; and an optical frequency detection device supported by the substrate and located to receive the second optical beam to detect and measure a frequency variation in the second optical beam caused by a frequency variation in light of the optical beam produced by the light source, wherein the optical frequency detection device is structured according to one of Items 1 through 13; and wherein the measured frequency variation in the second optical beam is used to compute a fast Fourier transform of the interference signal to obtain information contained in the returned probe light on temperature, strain, or stress as a function of a location in the fiber.

Item 23. The device as in Item 22, further comprising:

an electronic control module coupled to the light source and operable to adjust an optical frequency of the optical beam produced by the light source in response to the frequency variation detected by the optical frequency detection device.

Item 24. A photonic integrated interrogator chip for distributed interferometric sensing, comprising:

a plurality of waveguides including an input waveguide to receive input light, first, second, third, fourth, fifth, sixth, and seventh waveguides structured to support light in transverse electric (TE) polarization mode;

a first optical coupler to split the input light from the input waveguide into a first optical beam in the first waveguide and a second optical beam in the second waveguide;

an optical frequency detection device coupled to receive light from the first waveguide to detect and measure an optical frequency variation in the first optical beam caused by a frequency variation by the input light to produce an optical frequency variation signal, wherein the optical frequency detection device is structured according to one of Items 1 through 13;

a second optical coupler coupled to receive light from the second waveguide to split the second optical beam into a third optical beam in the third waveguide and a fourth optical beam in the fourth waveguide;

a waveguide delay line coupled to receive the third optical beam;

a third optical coupler coupled to receive the third optical beam from the waveguide delay line to split the third optical beam into a fifth optical beam received by the fifth waveguide and a sixth optical beam received by the sixth waveguide;

a first optical coherent receiver coupled to receive the fifth optical bam from the fifth waveguide as a local oscillator signal for coherent detection;

a second optical coherent receiver coupled to receive the sixth optical beam from the sixth waveguide as a local oscillator signal for coherent detection;

a polarization managing device coupled to receive the fourth optical beam from the fourth waveguide which directs the fourth optical beam to exit the interrogator chip from an output/input port for optical sensing of one or more target objects and for receiving a returned sensing beam containing a first polarization and second polarization from the one or more target objects, wherein the polarization managing device acts to separate light in the returned sensing beam with the first polarization into a first returned sensing beam in a seventh waveguide supporting a first TE mode and light in the returned sensing beam with the second polarization into a second returned sensing beam in an eighth waveguide supporting a second TE mode;

the first optical coherent receiver coupled to the seventh waveguide to receive the first returned sensing beam as an input signal to the first optical coherent receiver to interfere with the fifth optical beam to produce (1) a first detector signal proportional to a sine function of a phase difference between the fifth optical beam and the first returned sensing beam and (2) a second detector signal proportional to a cosine function of the phase difference between the fifth optical beam and the first returned sensing beam;

the second optical coherent receiver coupled to the eighth waveguide to receive the second returned sensing beam as an input signal to the second optical coherent receiver to interfere with the sixth optical beam to produce (1) a third detector signal proportional to a sine function of a phase difference between the sixth optical beam and the second returned sensing beam and (2) a fourth detector signal proportional to a cosine function of the phase difference between the sixth optical beam and the second returned sensing beam; and wherein the first, second, third, and fourth detector signals are processed in connection with the measured optical frequency variation in the first optical beam to provide information on amplitude, phase, motion, and location of the one or more target objects.

Item 25. The photonic integrated interrogator chip as in Item 24, wherein the polarization managing device includes a fourth optical coupler connected to a ninth optical waveguide supporting both TE and TM modes, an output/input port connected to the ninth optical waveguide, and a polarization beam splitter and rotator (PBSR).

Item 26. The photonic integrated interrogator chip as in Item 25, wherein the PBSR of the polarization managing device is configured to first separate light of the first polarization in a TE mode and light of the second polarization in a TM mode of the return sensing beam into light beams in two optical paths and converts the TM mode into the second TE mode;

Item 27. The photonic integrated interrogator chip as in Item 24, comprising a fifth optical coupler connected to a first end of a tenth optical waveguide supporting TE mode, and a 2-dimensional (2D) vertical grating coupler (VGC) connected to the second end of the tenth optical waveguide, wherein the 2D VGC couples the fourth optical beam into an optical fiber or into free space for sensing;

Item 28. The photonic integrated interrogator chip as in Item 27, wherein the 2D VGC is coupled to receive the return sensing beam containing both TE and TM polarization modes, directs the TE mode of the return sensing beam into the tenth optical waveguide, and directs the TM mode of the return sensing beam into an eleventh optical waveguide connected to a TM to TE mode converter to convert the return sensing beam in the TM mode into the second TE mode;

Item 29. The photonic integrated interrogator chip as in Item 24, wherein the first coherent receiver and the second coherent receiver are 90° hybrid receivers.

Item 30. The photonic integrated interrogator chip as in Item 24, wherein the first coherent receiver and the second coherent receiver include 2×4 multimode interference couplers.

Item 31. The photonic integrated interrogator chip as in Item 24, comprising a first variable optical attenuator connected to the seventh waveguide and a second variable optical attenuator connected to the eighth waveguide for adjusting the optical powers into the first coherent and the second coherent receivers.

Item 32. The photonic integrated interrogator chip as in Item 24, comprising a semiconductor optical amplifier connected to the fourth waveguide to amplify light in the fourth optical beam.

Item 33. A photonic integrated interrogator chip for distributed interferometric sensing, comprising:
a plurality of waveguides including an input waveguide to receive input light, first, second, third, fourth, fifth, sixth, and seventh waveguides structured to support light in transverse electric (TE) polarization mode;
a first optical coupler coupled to the input waveguide to split the input light from the input waveguide into a first optical beam in the first waveguide and a second optical beam in the second waveguide;
an optical frequency detection device coupled to receive light from the first waveguide to detect and measure an optical frequency variation in the first optical beam caused by a frequency variation by the input light to produce an optical frequency variation signal, wherein the optical frequency detection device is structured according to one of Items 1 through 13;
a second optical coupler coupled to receive light from the second waveguide to split the second optical beam into a third optical beam in the third waveguide and a fourth optical beam in the fourth waveguide;
a waveguide delay line coupled to receive the third optical beam;
a third optical coupler coupled to receive the third optical beam from the waveguide delay line to split the third optical beam into a fifth optical beam received by the fifth waveguide and a sixth optical beam received by the sixth waveguide;
a first 2×3 multimode interference coupler including a first port coupled to receive the fifth optical bam from the fifth waveguide and a second port coupled to the seventh waveguide;
a second 2×3 multimode interference coupler including a first port coupled to receive the sixth optical beam from the sixth waveguide and a second port coupled to the eighth waveguide;
a polarization managing device coupled to receive the fourth optical beam from the fourth waveguide which directs the fourth optical beam to exit the interrogator chip from an output/input port for optical sensing of one or more target objects and for receiving a returned sensing beam containing a first polarization and second polarization from the one or more target objects, wherein the polarization managing device acts to separate light in the returned sensing beam with the first polarization into a first returned sensing beam in a seventh waveguide supporting a first TE mode and light in the returned sensing beam with the second polarization into a second returned sensing beam in an eighth waveguide supporting a second TE mode, wherein the second port of the first 2×3 multimode interference coupler is coupled to the seventh waveguide to receive the first returned sensing beam as an input signal to the first 2×3 multimode interference coupler to interfere with the fifth optical beam to produce a first set of 3 interference signals which are 120° out of phase from one another;
the second port of the second 2×3 multimode interference coupler is coupled to the eighth waveguide to receive the second returned sensing beam as an input signal to the second 2×3 multimode interference to interfere with the sixth optical beam to produce a second set of 3 interference signals which are 120° out of phase from one another; and wherein the first set and second set interference signals are processed in connection with the measured optical frequency variation in the first optical beam to provide information on amplitude, phase, motion, and location of the one or more target objects.

Item 34. The photonic integrated interrogator chip as in Item 33, comprising a fourth optical coupler connecting to a ninth optical waveguide supporting both TE and TM modes, an output/input port connecting to the ninth optical waveguide, and a polarization beam splitter and rotator (PBSR).

Item 35. The photonic integrated interrogator chip as in Item 34, wherein the PBSR first separates light of the first polarization in a TE mode and light of the second polarization in a TM mode of the return sensing beam into two paths and converts the TM mode into the second TE mode;

Item 36. The photonic integrated interrogator chip as in Item 33, comprising a 5th optical coupler connecting to a first end of a 10th optical waveguide supporting TE mode, and a 2-dimensional (2D) vertical grating coupler (VGC) connecting to the second end of the 10th optical waveguide, wherein the 2D VGC couples the fourth optical beam into an optical fiber or into free space for sensing;

Item 37. The photonic integrated interrogator chip as in Item 36, wherein the 2D VGC is coupled to receive the return sensing beam containing both TE and TM polarization modes, directs the TE mode of the return sensing beam into the 10th optical waveguide, and directs the TM mode of the return sensing beam into the 11th optical waveguide connecting to a TM to TE mode converter to convert the return sensing beam in the TM mode into the second TE mode;

Item 38. The photonic integrated interrogator chip of Item 24 or Item 31 wherein the input waveguide receives light from different tunable light sources with different characteristics for different applications.

Item 39. The photonic integrated interrogator chip of Item 24 or Item 31 wherein the output/input port couples to an optical fiber for optical frequency domain reflectormetry (OFDR) applications.

Item 40. The photonic integrated interrogator chip of Item 24 or Item 31 wherein the light beam exits from the output/input port and couples to a scanning optics to cause a 2D beam scan for optical coherence domain tomography (OCT) applications.

Item 41. The photonic integrated interrogator chip of Item 24 or Item 31 wherein the light beam exits from the output/input port and couples to a scanning optics to cause a 2D beam scan for LiDAR applications.

While this patent document contains many specifics, these should not be construed as limitations on the scope of any disclosed technology or of what may be claimed, but rather as descriptions of features that may be specific to particular embodiments of particular disclosed technology. Certain features that are described in this patent document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a sub combination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in this patent document should not be understood as requiring such separation in all embodiments.

Only a few implementations and examples are described and other implementations, enhancements and variations can be made based on what is described and illustrated in this patent document.

What is claimed is:

1. A device operable based on measuring an optical frequency of light, comprising:

a laser that operates to produce a laser beam at a laser frequency and is operable to tune the laser frequency in response to a laser control signal applied to the laser;

a laser control circuit that produces the laser control signal and is coupled to the laser to apply the laser control signal to the laser;

an optical beam splitter located in an optical path of the laser beam to split the laser beam into a first laser beam along a first path and a second laser beam along a second path;

an optical frequency sensing device coupled in the first path to receive the first laser beam from the optical beam splitter to measure the laser frequency of the first laser beam based on measurements of sine and cosine functions of the laser frequency, wherein the optical frequency sensing device is further coupled to the laser control circuit to provide information on the measured laser frequency of the first laser beam, and wherein the laser and the laser control circuit are coupled and interactive with each other to enable the laser to stabilize or to change the laser frequency based on the measured laser frequency of the first laser beam; and an optical port coupled to in the second path to receive the second laser beam and to output the second laser beam as an optical output of the device.

2. The device as in claim 1, comprising:

an optical interferometer located in the second path between the optical port and the optical beam splitter to receive the second laser beam from the optical beam splitter and structured to include two interfering optical arms and an optical coupler coupled to the two interfering optical arms to cause interference between light in the two interfering optical arms to optically interfere to produce optical interference, wherein one of the two interfering optical arms is coupled to the optical port to receive returned light that is reflected from an object under illumination of the second laser beam so that the optical interference produces optical interference signals in the two interfering optical arms, respectively, each including information on the object carried within the returned light from the object;

an optical detection module coupled to receive and detect optical interference signals from the two interfering optical arms to extract information on the object illuminated by the second laser beam.

3. The device as in claim 2, wherein the optical detection module is operable to allow extraction of information on the object illuminated by the second laser beam based on measurements made via stabilizing the laser frequency of the second laser beam that illuminates the object.

4. The device as in claim 2, wherein the optical detection module is operable to allow extraction of information on the object illuminated by the second laser beam based on measurements made via scanning the laser frequency of the second laser beam that illuminates the object.

5. The device as in claim 1, wherein the optical interferometer located in the second path between the optical port and the optical beam splitter includes:
a first waveguide coupled to the optical port to receive and to guide a first portion of light of the second laser beam from the optical beam splitter to the optical port to form one of the two interfering optical arms;
a second waveguide coupled to receive and to guide a second portion of light of the second laser beam from the optical beam splitter and to form the other of the two interfering optical arms;
an optical coupler coupled to the first and second waveguides to cause light in the first and second waveguides to interact and to cause the optical interference;
an optical reflector coupled to the second waveguide to reflect light as a reference optical arm of the optical interferometer.

6. The device as in claim 5, wherein the optical detection module includes two photodetectors that detect the optical interference signals from the two interfering optical arms, respectively.

7. The device as in claim 1, wherein the optical frequency sensing device coupled in the first path to receive the first laser beam includes:
a substrate;
first optical waveguides integrated to and supported by the substrate and coupled to form a first Mach-Zehnder interferometer having two interfering optical arms and an input optical port to receive a first portion of the first laser beam that is split into the two interfering optical arms and an output optical port to receive and combine light from the two interfering optical arms to produce two first optical output interferometer signals;|
two first photodetectors supported by the substrate and located to receive the two first optical output interferometer signals, respectively, wherein the two first photodetectors produce first and second detector signals, respectively, and each of the first and second detector signals varies as a sine function of the laser frequency of the first laser beam;
second optical waveguides integrated to and supported by the substrate and coupled to form a second Mach-Zehnder interferometer having two interfering optical arms and an input optical port to receive a second portion of the first laser beam which is split into the two interfering optical arms, and an output optical port to receive and combine light from the two interfering optical arms to produce two second output interferometer signals, wherein the second Mach-Zehnder interferometer is structured to have a phase difference between the two interfering arms different by one quarter of the input optical wavelength from a phase difference between the two interfering arms of the first Mach-Zehnder interferometer;
two second photodetectors supported by the substrate and located to receive the two second optical output interferometer signals, respectively, wherein the two second photodetectors produce third and fourth detector signals, respectively, and wherein each of the third and fourth detector signals varies as a cosine function of the laser frequency of the first laser beam; and
a processing module coupled to receive the first, second, third and fourth detector signals and operable to process the first, second, third and fourth detector signals to determine a change in the laser frequency of the first laser beam.

8. The device as in claim 7, wherein each of the first and second Mach-Zehnder interferometer in the optical frequency sensing device includes at least one phase control device coupled to one of the two interfering arms to control the phase difference between the two interfering arms.

9. The device as in claim 8, wherein the at least one phase control device in the optical frequency sensing device includes a heater to control the phase difference between the two interfering arms.

10. The device as in claim 7, wherein the substrate in the optical frequency sensing device includes silicon or a silica.

11. The device as in claim 7, wherein the optical frequency sensing device includes:
a polarization beam splitter supported by the substrate and located in an optical path of the first laser beam to split the input light into a first input in a first optical polarization and a second input beam in a second optical polarization orthogonal to the first optical polarization;
a first optical coupler supported by the substrate and located to receive the first input beam and to split the first input beam into the first and second portions of the input light that are received, respectively, by the first and second Mach-Zehnder interferometers in the first optical polarization;
a second optical coupler supported by the substrate and located to receive the second input beam and to split the second input beam into third and fourth portions of the input light in the second optical polarization;
third optical waveguides integrated to and supported by the substrate and coupled to form a third Mach-Zehnder interferometer having two interfering optical arms and an input optical port to receive the third portion of input light which is split into the two interfering optical arms and an output optical port to receive and combine light from the two interfering optical arms to produce two third optical output interferometer signals;|
two third photodetectors supported by the substrate and located to receive the two third optical output interferometer signals, respectively, wherein the two third photodetectors produce fifth and sixth detector signals, respectively, and each of the fifth and sixth detector signals varies as a sine function of the optical frequency;
fourth optical waveguides integrated to and supported by the substrate and coupled to form a fourth Mach-Zehnder interferometer having two interfering optical arms and an input optical port to receive the fourth portion of the input light which is split into the two interfering optical arms, and an output optical port to receive and combine light from the two interfering optical arms to produce two fourth output interferometer signals, wherein the fourth Mach-Zehnder interferometer is structured to have a phase difference between the two interfering arms different by one quarter of the input optical wavelength from a phase difference between the two interfering arms of the third Mach-Zehnder interferometer;
two fourth photodetectors supported by the substrate and located to receive the two fourth optical output interferometer signals, respectively, wherein the two fourth photodetectors produce seventh and eighth detector signals, respectively, and wherein each of the seventh and eighth detector signals varies as a cosine function of the optical frequency; and wherein the processing module is further coupled to receive the fifth, sixth, seventh and eighth detector signals and operable to process the fifth, sixth, seventh and eighth detector signals to determine a change in the laser frequency of the first laser beam.

12. The device as in claim 7, wherein the optical frequency sensing device includes:

a beam splitter supported by the substrate and located in an optical path of the first laser beam to split the input light into a first input beam and a second input beam;

an optical coupler supported by the substrate and located to receive the first input beam and to split the first input beam into the first and second portions of the input light that are received, respectively, by the first and second Mach-Zehnder interferometers;

third optical waveguides integrated to and supported by the substrate and coupled to form a third Mach-Zehnder interferometer having two interfering optical arms and an input optical port to receive the second input beam which is split into the two interfering optical arms and an output optical port to receive and combine light from the two interfering optical arms to produce two third optical output interferometer signals, wherein the third Mach-Zehnder interferometer is structured to have a phase difference between the two interfering arms that is smaller than the phase difference in the two interfering arms of the first and second Mach-Zehnder interferometer; and two third photodetectors supported by the substrate and located to receive the two third optical output interferometer signals, respectively, wherein the two third photodetectors produce fifth and sixth detector signals, respectively.

13. The device as in claim 7, wherein the optical frequency sensing device includes:

a beam splitter supported by the substrate and located in an optical path of the first laser beam to split the first laser beam into a first input beam light and a second input beam;

a first optical coupler supported by the substrate and located to receive the first input beam and to split the first input beam into the first and second portions of the input light that are received, respectively, by the first and second Mach-Zehnder interferometers;

a second optical coupler supported by the substrate and structured to include two third optical waveguides that are placed adjacent to each other to cause optical evanescent coupling between the two third optical waveguides as a directional optical coupler located to receive the second input beam and to split the second input beam into third and fourth optical signals;

two third photodetectors supported by the substrate and coupled to receive the third and fourth signals output by the second optical coupler, respectively, wherein the two third photodetectors produce fifth and sixth detector signals, respectively; and wherein the processing module is further coupled to receive the fifth and sixth detector signals and operable to process the fifth and sixth detector signals to determine an absolute frequency value of the laser frequency of the first laser beam.

14. The device as in claim 1, wherein the optical frequency sensing device coupled in the first path to receive the first laser beam includes:

a substrate;

a beam splitter supported by the substrate and located in an optical path of the first laser beam to split the input light into a first input beam and a second input beam;

a first optical coupler supported by the substrate and located to receive the first input beam and to split the first input beam into first and second portions of the first input beam;

first optical waveguides integrated to and supported by the substrate and coupled to form a first Mach-Zehnder interferometer having two interfering optical arms and an input optical port to receive the first portion of the first input beam and split the received first portion into different beams in the two interfering optical arms and an output optical port to receive and combine light from the two interfering optical arms to produce three or more first optical output interferometer signals in different phases relative to one another;| three or more first photodetectors supported by the substrate and located to receive the three or more first optical output interferometer signals, respectively, wherein the first photodetectors produce three or more first detector signals, respectively, and each of the first detector signals varies as a sine or cosine function the laser frequency of the first laser beam;

second optical waveguides integrated to and supported by the substrate and coupled to form a waveguide device to receive the second input beam from the beam splitter and to produce two output signals of complementary wavelength responses;

two second photodetectors supported by the substrate and located to receive the two output signals of the waveguide device, respectively, wherein the two second photodetectors produce two second detector signals, respectively, and wherein each of the second detector signals varies as a cosine function of the laser frequency of the first laser beam; and a processing module coupled to receive the first and second detector signals and operable to process the first and second detector signals to determine an absolute value of, and a change in, the laser frequency of the first laser beam.

15. The device as in claim 14, wherein the waveguide device in the optical frequency sensing device is structured as a Mach-Zehnder interferometer having a larger free spectral range than a free spectral range of the first Mach-Zehnder interferometer.

16. The device as in claim 14, wherein the waveguide device in the optical frequency sensing device is structured as a directional coupler with a coupling ratio a slow function of optical wavelength having a larger free spectral range than a free spectral range of the first Mach-Zehnder interferometer.

17. The device as in claim 14, wherein the output optical port in the optical frequency sensing device is a 2×3 multimode interference coupler with 3 output ports to produce three interference signals.

18. The device as in claim 14, wherein the output optical port in the optical frequency sensing device is a 2×4 multimode interference coupler with 4 output ports to produce four interference signals.

19. A device for light detection and ranging (LiDAR) on a substrate, comprising:
- a light source to produce an optical beam;
- a beam splitter to split the optical beam into a first optical beam and a second optical beam;
- a beam scanning device located in an optical path of the first optical beam to direct and scan the first optical beam to a surrounding area for LiDAR sensing and to receive returned light from objects in the surrounding area illuminated by the first optical beam;
- an optical detector module coupled to receive the returned beam from the optical scanning device and to produce a detector output signal for LiDAR sensing; and
- an optical frequency detection device located to receive the second optical beam to detect and measure a frequency variation in the second optical beam caused by a frequency variation of the optical beam produced by the light source,
- wherein the optical frequency detection device is structured and formed on a substrate according to claim 1; and
- wherein the measured frequency variation in the second optical beam is used to compute a fast Fourier transform of the detector output signal to obtain information of locations and speeds of the objects illuminated by the first optical beam.

20. A device for optical coherent tomography (OCT) on a substrate, comprising:
- a light source to produce an optical beam;
- a beam splitter to split the optical beam into a first optical beam and a second optical beam;
- an OCT module coupled to receive the first optical beam from the optical beam splitter to split the first optical beam into an OCT reference beam and an OCT sampling beam for sampling a target, and configured to cause optical interference between the OCT reference beam and a returned OCT sampling beam from the target for OCT detection; and
- an optical frequency detection device located to receive the second optical beam to detect and measure a frequency variation in the second optical beam caused by a frequency variation by the light source,
- wherein the optical frequency detection device is structured and formed on a substrate according to claim 1.

21. A device operable based on measuring an optical frequency of light, comprising:
- a broadband light source that operates to produce a probe beam at a range of optical frequencies;
- an optical circulator coupled in an optical path of the probe beam from the broadband light source to direct the probe beam at an optical input/output port coupled to a fiber line and to receive returned light from the fiber line and to direct the returned light to a new optical path different from the optical path of the probe beam when propagating to ward to the optical circulator;
- a wavelength division demultiplexer located to receive the returned light from the optical circulator and to split the returned light into different returned beams at different optical frequencies within the range of optical frequencies produced by the broadband light source;
- an optical switching device located to receive the different returned beams at different optical frequencies from the wavelength division demultiplexer and structured to operate to allow one beam to pass through at a time so that the different returned beams at different optical frequencies from the wavelength division demultiplexer are directed to pass through the optical witching device one at a time;
- an optical frequency sensing device coupled to receive light of the different returned beams at different optical frequencies from the optical switching device that passes through the optical switching device and operable to measure an optical frequency of the light that passes through the optical switching device based on measurements of sine and cosine functions of the optical frequency of the light that passes through the optical switching device to enable measurements of the optical frequency of each of the different returned beams at different optical frequencies produced by the wavelength division demultiplexer; and
- a processor to receive the measurements of the optical frequencies of the different returned beams from the fiber line to extract information on the fiber line, including a temperature or strain at different locations of the fiber line.

22. A device operable based on measuring an optical frequency of light, comprising:
- a broadband light source that operates to produce a probe beam at a range of optical frequencies;
- an optical circulator coupled in an optical path of the probe beam from the broadband light source to direct the probe beam at an optical input/output port coupled to a fiber line and to receive returned light from the fiber line and to direct the returned light to a new optical path different from the optical path of the probe beam when propagating to ward to the optical circulator;
- a wavelength division demultiplexer located to receive the returned light from the optical circulator and to split the returned light into different returned beams at different optical frequencies within the range of optical frequencies produced by the broadband light source;
- a plurality of optical frequency sensing devices coupled to receive the different returned beams at different optical frequencies, respectively, one device per returned beam, wherein each optical frequency sending device is operable to measure an optical frequency of the light based on measurements of sine and cosine functions of the optical frequency of the light so that measurements of the optical frequencies of the different returned beams can be measured; and
- a processor to receive the measurements of the optical frequencies of the different returned beams from the fiber line to extract information on the fiber line, including a temperature or strain at different locations of the fiber line.

23. A photonic integrated interrogator chip for interferometric sensing of an object, comprising:
- an optical input port to receive input laser light;
- a waveguide coupled to the optical input port to guide the input laser light received at the optical input port;
- an optical input/output port separated from the optical input port and coupled to the waveguide to receive a portion of the laser light in the waveguide and to output the received portion as probe light for optical sensing of an object and to receive returned probe light from the object;
- a first optical coupler coupled to the waveguide to split a first portion of the laser light out of the waveguide into a first optical beam;
- an optical frequency sensing device coupled to receive the first optical beam from the first optical coupler and operable to measure an optical frequency of the first optical beam based on measurements of sine and cosine functions of the optical frequency of the first optical beam;

a second optical coupler coupled to the waveguide to split a second portion of the laser light out of the waveguide into a second optical beam as an optical reference beam for optical interference operations performed within the photonic integrated interrogator chip;

a first optical coherent receiver coupled to receive a first portion of the optical reference beam output by the second optical coupler and structured to include a first optical interferometer to cause the first portion of the optical reference beam to optically interfere with a first portion of the returned probe light from the object to produce two first optical interference signals;

a second optical coherent receiver coupled to receive a second portion of the optical reference beam output by the second optical coupler and structured to include a second optical interferometer to cause the second portion of the optical reference beam to optically interfere with a second portion of the returned probe light from the object to produce two second optical interference signals;

four optical detectors coupled to receive the two first optical interference signals and the two second optical interference signals, respectively, one signal per detector, wherein the measurement of the optical frequency of the first optical beam split from the laser light and information of the two first optical interference signals and the two second optical interference signals are used for extracting information of the object illuminated by the probe light output by the optical input/output port.

24. The photonic integrated interrogator chip as in claim 23, further comprising an optical polarization device coupled between the optical input/output port and the first and second optical coherent receivers to split the returned probe light from the object into the first portion of the returned probe light received by the first optical coherent receiver and the second portion of the returned probe light received by the first optical coherent receiver while rendering the first and second portions in a common optical polarization.

* * * * *